(12) United States Patent
Dodds et al.

(10) Patent No.: US 8,728,348 B2
(45) Date of Patent: May 20, 2014

(54) MICROWAVE PROCESSING OF FEEDSTOCK, SUCH AS EXFOLIATING VERMICULITE AND OTHER MINERALS, AND TREATING CONTAMINATED MATERIALS

(75) Inventors: Christopher Dodds, Nottingham (GB); Georgios Dimitrakis, Nottingham (GB); Sam Kingman, Nottingham (GB)

(73) Assignee: The University of Nottingham, Nottingham (GB)

( * ) Notice: Subject to any disclaimer, the term of this patent is extended or adjusted under 35 U.S.C. 154(b) by 295 days.

(21) Appl. No.: 13/140,764

(22) PCT Filed: Dec. 18, 2009

(86) PCT No.: PCT/GB2009/051744
§ 371 (c)(1),
(2), (4) Date: Nov. 30, 2011

(87) PCT Pub. No.: WO2010/070357
PCT Pub. Date: Jun. 24, 2010

(65) Prior Publication Data
US 2012/0088950 A1    Apr. 12, 2012

(30) Foreign Application Priority Data

Dec. 18, 2008   (GB) .................................. 0823091.4

(51) Int. Cl.
| | |
|---|---|
| C04B 14/00 | (2006.01) |
| C04B 16/00 | (2006.01) |
| C04B 18/00 | (2006.01) |
| C04B 20/06 | (2006.01) |
| H05B 6/64 | (2006.01) |
| H05B 6/70 | (2006.01) |

(52) U.S. Cl.
USPC .................. 252/378 R; 219/678; 219/690

(58) Field of Classification Search
USPC ........ 252/378 R; 219/690–697, 678, 702, 761
See application file for complete search history.

(56) References Cited

U.S. PATENT DOCUMENTS 3,753,923 A * 8/1973 Wada .......................... 52/378 R
(Continued)

FOREIGN PATENT DOCUMENTS

GB   2 437 931   11/2007
(Continued)

OTHER PUBLICATIONS

Robinson, et al., "Microwave treatment of oil contaminated drill cuttings at pilot scale", International Conference on Health, Safety and Environment in Oil and Gas Exploration and Production, SPE, US; Nice, France, Jan. 1, 2008 pp. 1-7, XP008125073.
Robinson, et al., "Microwave enhanced stripping of oil contaminated drill cuttings" Journal of Environmental Management, vol. 88, No. 2, Jul. 1, 2008, ISSN: 0301-4797 pp. 211-218.

(Continued)

*Primary Examiner* — Anthony J Zimmer
(74) *Attorney, Agent, or Firm* — Baker Botts L.L.P.

(57) ABSTRACT

Ways of applying microwaves to feedstock to be processed are disclosed. One embodiment relates to heating inter-layer water in vermiculite to expand the vermiculite. Another embodiment relates to heating water in oil-contaminated materials and waste products, such as drilling cuttings, contaminated soils and certain types of animal by-products, to drive out oil. In some embodiments a microwave tunnel applicator has the microwaves applied from beneath the feedstock.

20 Claims, 27 Drawing Sheets

(56) References Cited

U.S. PATENT DOCUMENTS

| | | | |
|---|---|---|---|
| 3,758,415 A * | 9/1973 | Wada | 52/378 R |
| 3,830,892 A * | 8/1974 | Wada | 64/489 |
| 4,305,992 A * | 12/1981 | Langer et al. | 428/324 |
| 4,818,831 A * | 4/1989 | Seaborne | 219/730 |
| 4,965,423 A * | 10/1990 | Seaborne | 219/759 |
| 5,487,873 A | 1/1996 | Bridges et al. | |
| 6,355,098 B1 * | 3/2002 | Pfemeter | 106/602 |
| 2006/0266956 A1 * | 11/2006 | Sklyarevich et al. | 250/492.1 |
| 2010/0107931 A1 * | 5/2010 | Roulston | 106/409 |

FOREIGN PATENT DOCUMENTS

| | | |
|---|---|---|
| WO | WO03/083146 | 10/2003 |
| WO | WO2006/034553 | 4/2006 |
| WO | WO2006/127025 | 11/2006 |
| WO | WO 2007/007068 | 1/2007 |
| WO | WO2008/059240 | 5/2008 |
| WO | WO2008/116122 | 9/2008 |

OTHER PUBLICATIONS

Shang, et al., "Microwave treatment of oil-contaminated North See Drill Cuttings in a High Power Multimode Cavity" Separation and Purification Technology, vol. 49, Jan. 1, 2006 pp. 84-90, XP002506106.

Clark, D. E., et al. "Processing materials with microwave energy" Materials Science and Engineering A: Structural Materials: Properties Microstructure & Processing, Aug. 15, 2000, pp. 153-158, XP008125077.

Shang, et al. "Reactors effects on microwave decontamination of oily wastes in a multimode cavity" Industrial & Engineering Chemistry Research, American Chemical Society, US LNKD-DOI: 10.1021/IE070124L, vol. 46, No. 14, Jul. 4, 2007, pp. 4811-4818 XP008125130 ISSN: 0888-5885.

Shang, et al., "Treatment of oil contaminated drill cuttings by microwave heating in a high power single mode cavity", Industrial & Engineering Chemistry Research, American Chemical Society, vol. 44, No. 17, Aug. 17, 2005 pp. 6837-6844.

* cited by examiner

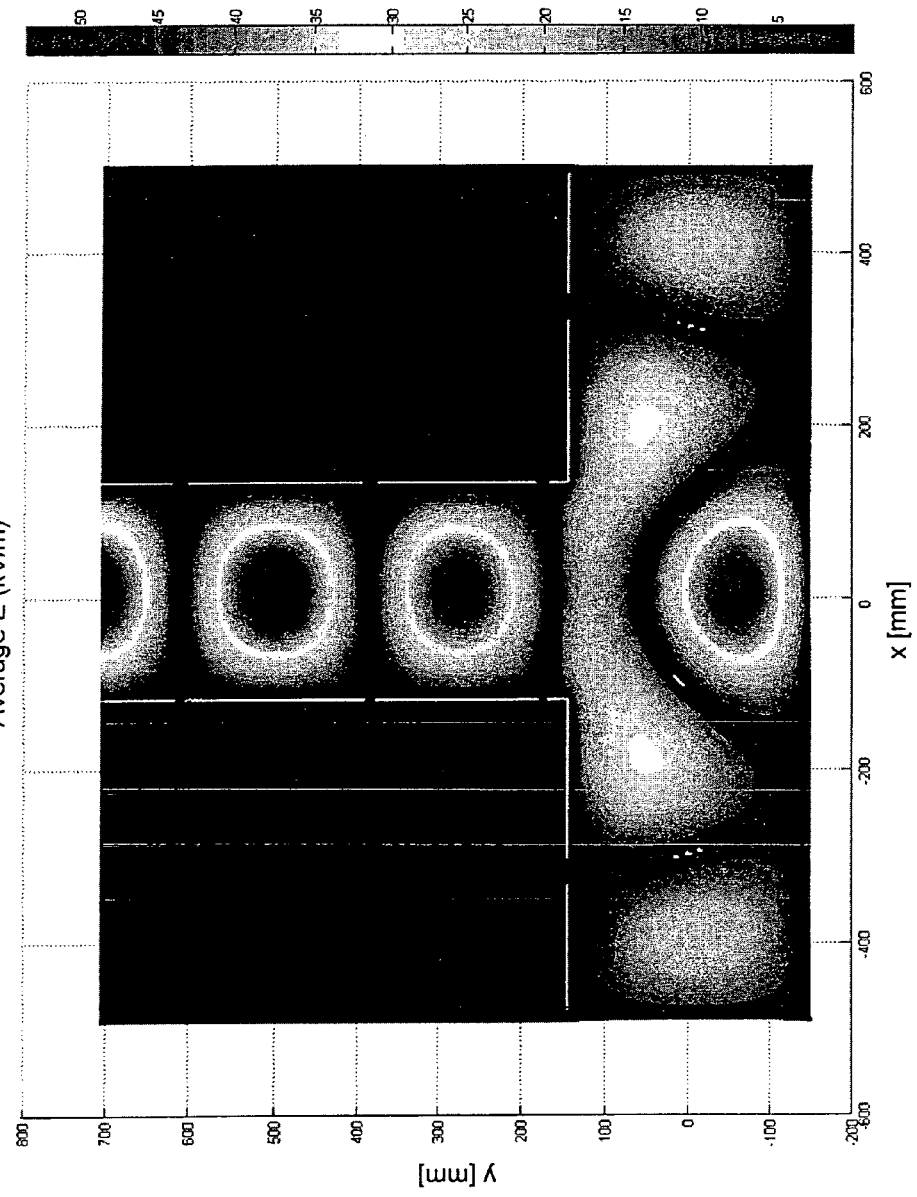

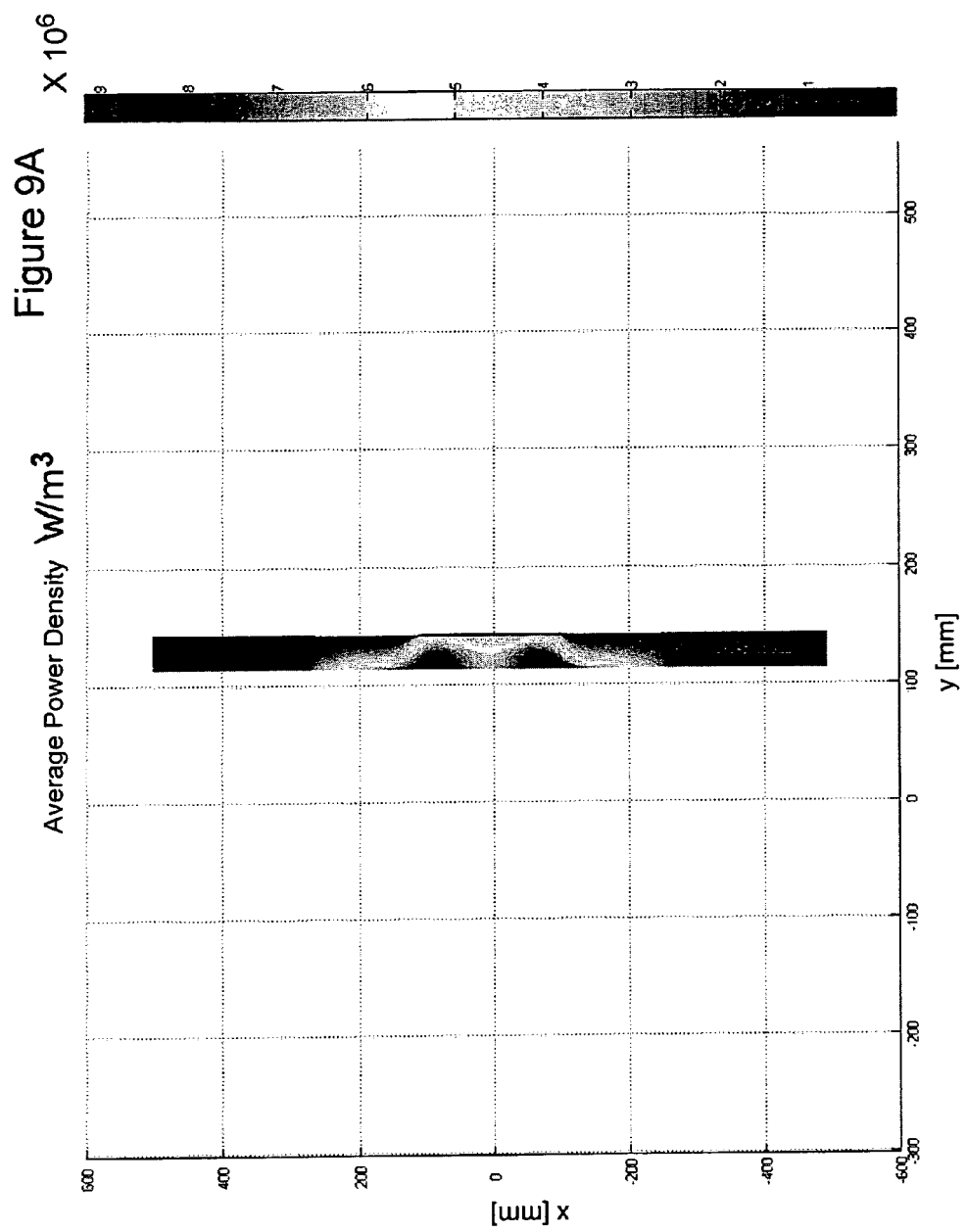

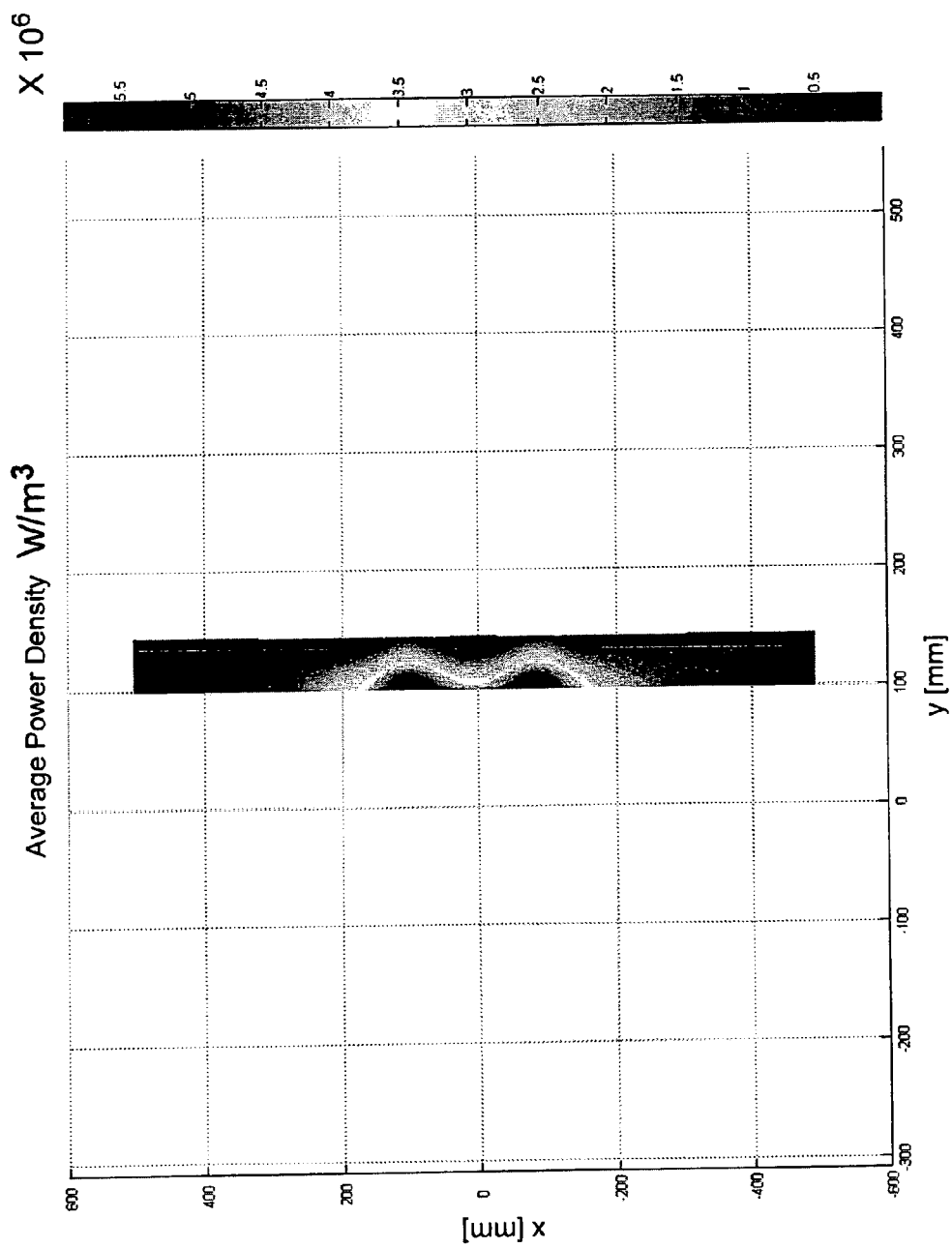

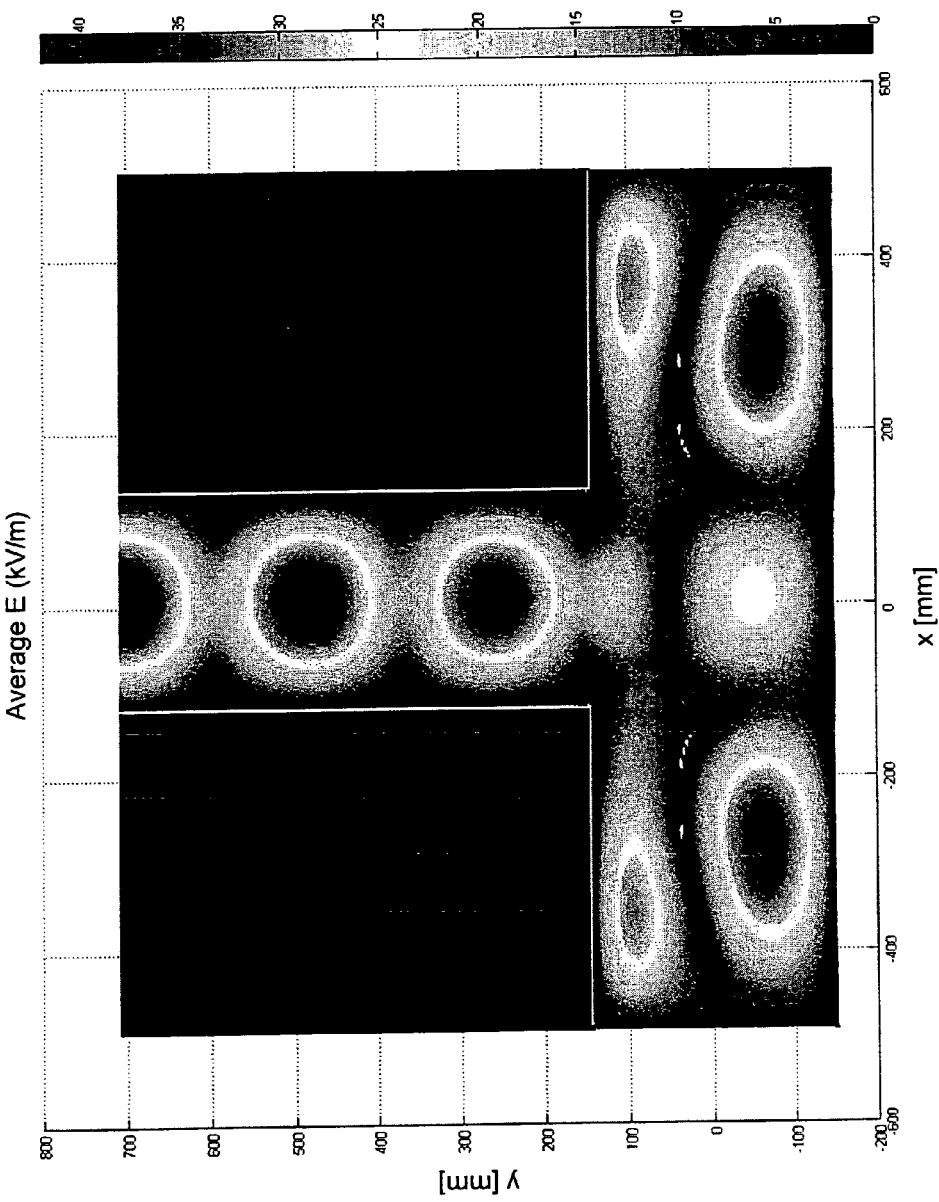

MICROWAVE PROCESSING OF FEEDSTOCK, SUCH AS EXFOLIATING VERMICULITE AND OTHER MINERALS, AND TREATING CONTAMINATED MATERIALS

TECHNICAL FIELD

This invention relates to the microwave processing of feedstock. One area of application relates to methods and apparatus for exfoliating, or expanding, vermiculite or other minerals containing interlayered water. Another area of application relates to removing oil from oil-contaminated materials and waste products, such as drill cuttings and certain types of animal by-products, in addition to treatment of contaminated land and soils etc.

BACKGROUND

The invention was originally made whilst we were considering the production of vermiculite, and it is convenient to introduce it in that context. Vermiculite is mined in a hydrated state where it consists of thin sheets of mineral with associated water. It can be expanded, or exfoliated, to a volume 5 to 10 to 20 times its original size by heating the mineral. There is a large global industry in vermiculite—perhaps 600,000 tonnes are mined a year. Uses include fluid absorption—such as water absorption (e.g. in horticulture), friction products (such as brake pads), thermal insulation, refractory products, building construction boards and materials, in paints, and various other uses.

There are various grades of vermiculite depending upon the size of the particles being expanded. These range through: large, medium, fine, super fine, and micron (V4 to V0 in the USA). A place to reference these sizes is www.vermiculite.org/properties.htm Expanded vermiculite is expensive to transport—it is low weight and high volume. Nevertheless, expanded vermiculite is transported across the world. The website gives average diameters of the expoliated vermiculite particles as:

| | |
|---|---|
| Large | 8 mm |
| Medium | 4 mm |
| Fine | 2 mm |
| Superfine | 1 mm |
| Micron | 0.5 mm |

The traditional way of exfoliating vermiculite is to use a large hydrocarbon-fueled kiln or furnace and add unexpanded vermiculite at the top, have the vermiculite pass through a heating zone in the kiln, and have expanded vermiculite fall out at the end of the kiln. This uses a lot of energy—perhaps 500-1000 kilowatt hours per ton. The kiln and associated equipment takes up a lot of space and it is an expensive capital piece of equipment. It needs to be kept running at all times otherwise the refractory lining of the kiln can crack and be damaged. The exfoliating vermiculite comes out at many hundred degrees centigrade and needs to stand in piles to cool down before it can be bagged. The vermiculite passing through the kiln rubs against itself and this often causes break up of the product to some degree. Indeed, dust extraction, and hot air handling, apparatus can also be a major part of an industrial vermiculite production kiln/furnace, and itself can use many hundreds of kilowatt hours of power, and be very expensive.

The vermiculite is heated to approximately 600° C. If it is heated for too long it can "cook", and talc is produced instead of exfoliated vermiculite through removal of structural hydroxyl groups. A typical yield is about 85% (by mass), i.e. the mass of the expanded useful vermiculite is about 85% of the mass of the unexpanded vermiculite. Different furnaces or kilns with different temperatures and dwell times in the heating zones of the furnaces or kilns, are used to produce vermiculite of different grades/sizes.

There have been proposals to use microwaves to exfoliate minerals, such as vermiculite. However, none of them have really worked very well. Some involve adding hydrogen peroxide or ammonia to the vermiculite, and then applying microwaves. This is because microwaving it without pretreatment has been found not to work effectively. For example this approach is given by U.S. Pat. No. 3,758,415.

Also published is PCT patent application WO 2006/127025 by Sklyarevich and Shevelev. This teaches the use of microwave radiation to expand perlite (a very different mineral structure to vermiculite). It suggests using 83 GHz microwave energy with a energy density of around 5 kilowatts per square centimeter of the propagating wave in free space, and a total power of around 13 kilowatt hours, with a production speed of about 30 grams per second.

It has been especially problematic to use microwaves to exfoliate fine grades of vermiculite, and it has not been demonstrated to use microwave exfoliation for any grade commercially at commercial volumes.

SUMMARY

According to a first aspect of the invention, a method of expanding a mineral material having a water interlayer between mineral layers from a hydrated, unexpanded state to a less hydrated, expanded state comprises heating interlayer water in the mineral to a temperature such as to cause the water to cause the mineral to expand by applying microwaves to the mineral, the microwaves having;
 (i) a frequency of between 1 MHz and 3 GHz; and
 (ii) a power density of at least $1 \times 10^6$ W/m$^3$ in the water phase.

The method may be applied to exfoliating vermiculite. We believe that the microwaves, of a frequency to excite water, cause interlayer water in the vermiculite to turn to steam, forcing the layers to expand. There is often about (or at least) a ten-fold increase in volume.

In the current invention we are not aiming to heat the mineral phase (or other microwave transparent phases), just the interlayered water. Unlike WO 2006/127025 which is based on free radiation, our apparatus is based upon guided waveguides to increase the throughput (twice to 5 times higher than that prior art). Perlite will never work in our application as the water does not get hot enough to cause softening of the mineral.

Relative movement between the mineral and a microwave field may be caused to happen, for example by moving the mineral past or through a microwave heating/material expanding zone (this is easier than moving a microwave emitter over the mineral). The mineral may be moved past or through the zone generally horizontally and/or on a conveyor belt.

The microwaves are preferably substantially constrained to stay within a microwave waveguide, and the mineral may be moved through the waveguide structure.

There may be more than one microwave heating zone and preferably substantial power transfer from one zone to another may be prevented by using a filter or choke disposed between the microwave heating zones.

A bed or layer of particles of the mineral may be created. The microwaves may be applied from beneath the bed. Expanded particles of mineral may rise up the bed of particles away from the point of application of microwaves, and unexpanded, or less expanded more dense particles, may fall downwards in the bed to move closer to the point of application of the microwaves.

The idea of applying microwaves from beneath a bed of feedstock to be processed is applicable generally and constitutes a second invention in its own right, as discussed later.

The method may comprise applying an appropriate number of kW of power to the mineral in order to create a power density of the order of at least, or about, $1\times10^6$ W/m$^3$. The power density could be $5\times10^6$ W/m$^3$ or more.

There may be little purpose in using power densities that are too high. Once the power density gets to a level so as to cause the interlayer water to be driven off extra power may heat the steam. As a practical matter we may chose not to use power densities of above about $12.18\times10^6$ W/m$^3$.

At least 300 kg/hour of expanded vermiculite may be produced at a power input of 25 kW at 2.45 GHz.

The bulk mineral may be substantially transparent to the microwave frequency used.

Microwaves may be applied at a heating zone and dust and steam may be extracted at the heating zone.

The expanded mineral may be produced having a bulk temperature of about or less than 150° C., or of about or less than 100° C., when expanded. Expanded mineral may be passed directly from an expanding process to a packaging process, without a stationary cooling down process in between.

The method may comprise having a bed of mineral particles with a depth of preferably at least 1 mm at the time that microwaves are applied to the particles. The bed depth may be of the order of, or at least, 1, 5, 10, 15, 20, 25, 30, 40, 50, 60, 70, 80, or more mm deep.

The microwave heating zone may extend across substantially the full width of a conveyor belt and the peak process power density experienced by the interlayered water inside the mineral particles as they pass through the heating zone may be uniform to within 20%, across the width of the belt.

In other modifications, the vermiculite could be any feedstock material being processed in the microwave heating zone. However, it is to be appreciated that the microwave heating zone may possibly need to altered in size and/or configuration to facilitate heating of different types of feedstock.

The method may be performed by a mobile mineral expander, optionally provided in or on a wheeled vehicle.

By "particles" it will be appreciated that this encompasses all of the grades of vermiculite. Other terms could be "pieces", or "grains", or "granules", or "chips", or "clumps", or the like, and for materials that are not vermiculite the particles could be bigger, or smaller, or of the same order of size as vermiculite particles.

BRIEF DESCRIPTION OF THE DRAWINGS

Embodiments of the invention will now be described by way of example only, with reference to the accompanying drawings of which:

FIGS. 8A and 8B show average electric field in the applicator of FIG. 7 with a layer of vermiculite 30 mm deep;

FIGS. 9A and 9B show average power density of the microwave field on the applicator of FIG. 7 with a layer of vermiculite 30 mm deep;

FIGS. 11A and 11B show average power densities of the microwave field in the applicator of FIG. 7 with a vermiculite layer 45 mm deep;

FIGS. 12A and 12B show average electric field in the applicator of FIG. 7 with a vermiculite layer 60 mm deep;

DETAILED DESCRIPTION

Figure 1:
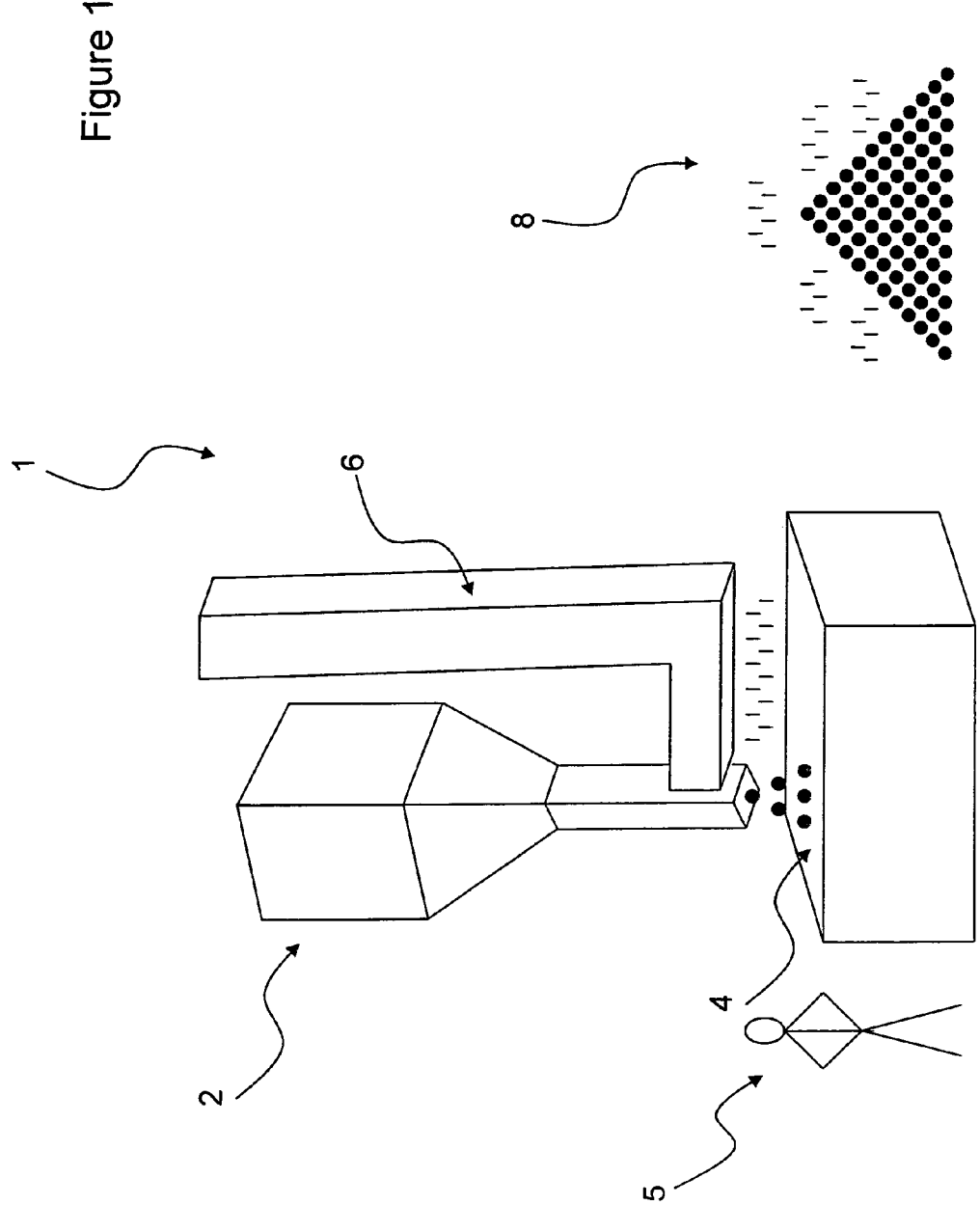
FIG. 1 shows a conventional prior art furnace-based vermiculite exfoliating plant.

FIG. 1 shows schematic representation of the prior art, in this case a furnace-based exfoliating plant. A vermiculite expander system 1 comprises a large hydrocarbon-fuelled furnace 2, an expanded or exfoliated product discharge station 4, a dust extractor unit 6 and a cooling region 8. For scale, FIG. 1 also shows a schematic drawing of a person 5.

The unexpanded vermiculite is loaded into the furnace 2 where it is heated and subsequently expanded. The expanded vermiculite falls out of the bottom of the furnace 2 into the product discharge station 4.

The dust extractor unit 6 is required to remove the majority of harmful dust which is created from this process.

The expanded vermiculite is ejected from the furnace 2 at a temperature of several hundred degrees centigrade and is therefore transported to the cooling region 8 where it stands in piles to cool down before it can be bagged.

Figure 2:
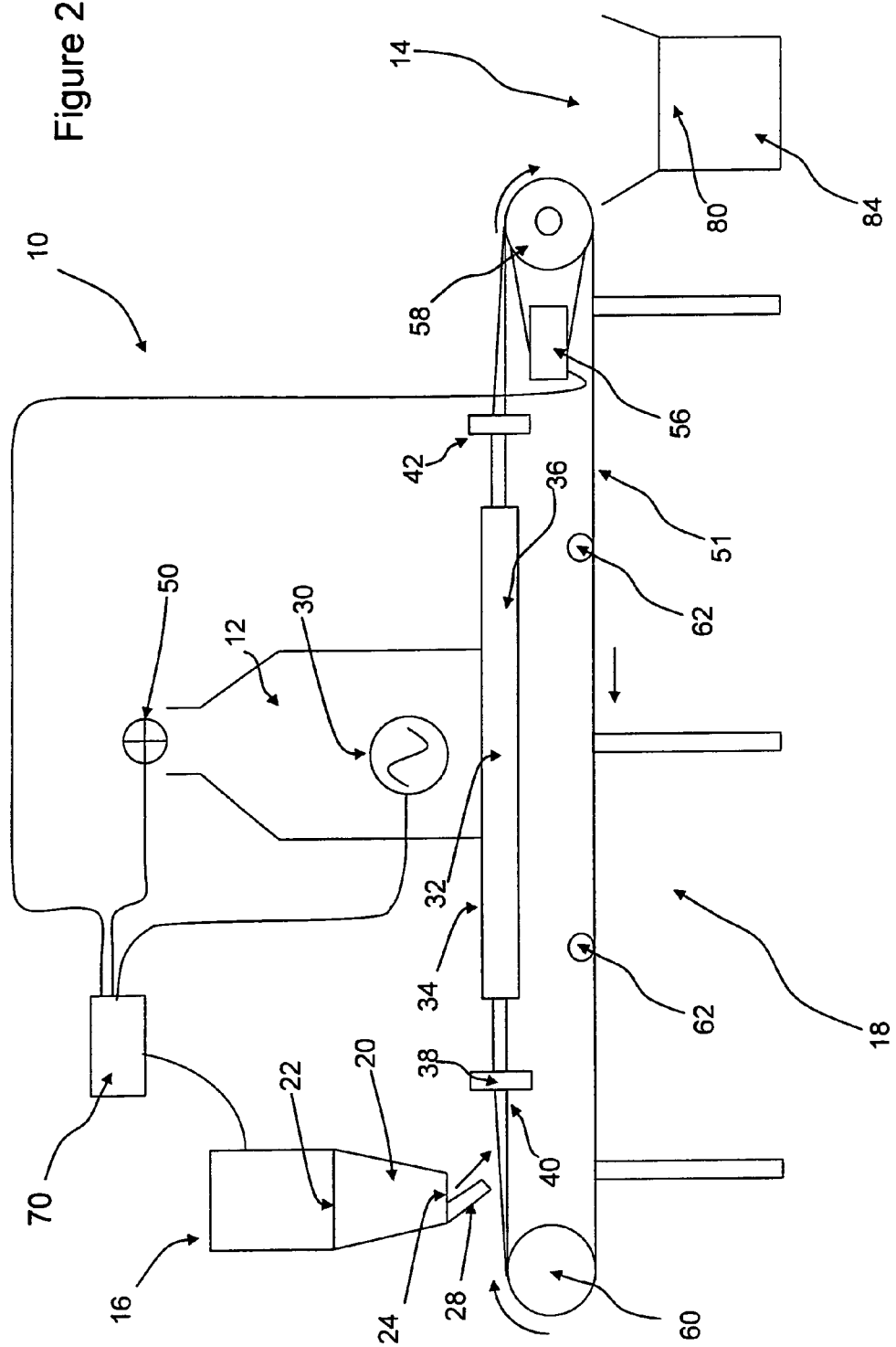
FIG. 2 shows an embodiment of the invention that uses microwave exfoliation.

FIG. 2 shows a vermiculite expander apparatus or system 10 comprising a microwave heating or exfoliating unit 12, an expanded or exfoliated product discharge station 14, an unexpanded, improved product (vermiculite) feed station 16, and a material transport system 18 presented to transport the vermiculite from the feed station 16 to the microwave heating unit 12 and on to the product discharge station 14.

The mineral particles of the vermiculite will typically be of a size from something of the order of tenths of a millimeter to something of the order of a centimeter, in longest dimension.

The expander apparatus 10 is, in this example, about 6.5 m long and about 2 m high, which is a lot smaller that a conventional furnace exfoliating system.

The feed station 16 has a feed hopper 20 which contains unexpanded vermiculite in use and has an upper inlet end 22, and a lower, narrower (e.g. frusto-conically shaped) outlet end 24. The outlet end 24 has an outlet aperture 26 provided with a valve 27 which in use delivers vermiculite/unexpanded product to the transport system 18 (in this embodiment via a sloping, inclined, feed chute 28). An alternative transport system could be a vibratory or screw feeder. The aim of the delivery system is to deliver a controlled layer of material onto the belt at the appropriate rate. The microwave heating unit 12 has a microwave generator 30 (e.g. magnetron or triode based) provided by an electrical power supply. The microwave generator 30 produces microwaves with an appropriate electric field strength to create a power density of $1 \times 10^6$ W/m$^3$ in the water layer at a treatment zone or region 32 contained in a wave guide 34. Of course, it is to be appreciated that a different power density may be required for different applications of the microwave heating unit, and in particular for drill cuttings this may be lower or higher than the above power density figure. The treatment region has a width of between 1 and 30 cm, a height of about 50 cm and a length (along the direction of travel of the product through the treatment region) of less than about 70 cm. The power output of the power generator 30 is up to several hundreds of kilowatts.

The electric field in the treatment region 32 is designed to be generally uniform in the sense that any particular straight line path of product through the treatment region 32 at a constant speed will expose the product to substantially the same electric field and therefore power density (so the product experiences substantially the same processing).

FIGS. 9A, 9B, 11A, 11B, 13A, and 13B show a representation of power density in the treatment region 32, discussed further below.

The heating unit 12 comprises a tunnel microwave arrangement having a metal tunnel 36 which has a microwave choke 38 towards an entrance end 40 of the tunnel, and another microwave choke 42 towards an exit end of the tunnel 36, with the microwave generator 30 situated between the chokes. The chokes prevent, or massively reduce, microwaves escaping from the open ends of the tunnel 36. A dust extractor 50 is provided at the treatment region 32 and comprises a fan or pump to extract air, and dust entrained in the air, from the enlarged treatment zone part of the tunnel 36.

Figure 4:
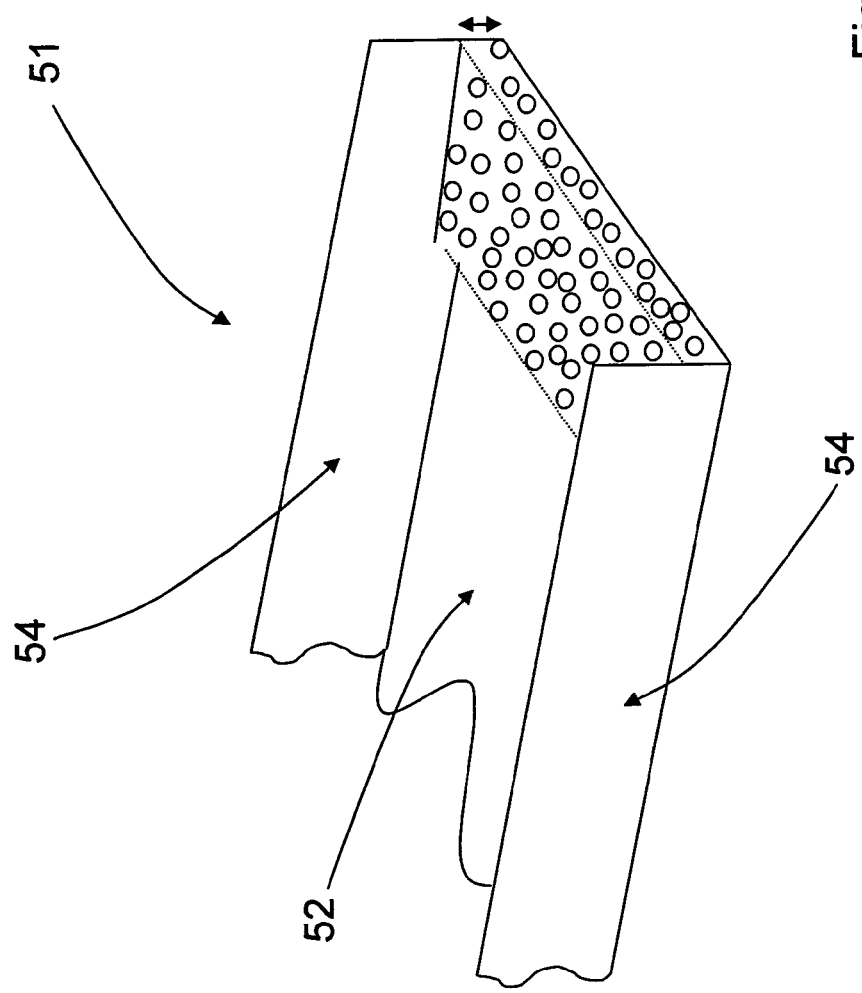
FIG. 4 shows the conveyor belt of the machine of FIG. 2 or FIG. 3 in more detail.

The mineral transport system 18 comprises a conveyer belt 51 made of fibreglass (or other material) substantially transparent to the microwaves being used and capable of experiencing temperatures of the order of 100° (which is higher than we see existing in the process, but it is prudent to have a safety margin). The conveyor belt 51 is shown in FIG. 4 and has a generally flat base 52 and two side walls 54 upstanding from the base 52, to form an open-topped trough. The width of the belt is about the same size as the microwave tunnel applicator 36 (typically 20 or 30 cm).

The belt 51 is driven by an electric motor 56 to go around end rollers 58 and 60. Guide or idler rollers 62 are also provided to support the belt at places.

The expander apparatus or system 10 has a controller 70 which controls the operation of the conveyor belt motor 56, the microwave generator 30, the dust extractor 50, and the feed station 16.

The controller 70 can be, in this example, manually operated by a person to set speeds/levels for the things controlled, or in another embodiment there may be a selector switch or control to select the grade of vermiculite to be introduced from the feed station and the controller may control the equipment using solely that information as a user input. It would then be a de-skilled operation to use the apparatus.

The product discharge station 14 has, shown in FIG. 2, a product packaging unit 80 which takes expanded product from the conveyor belt 51 and pours it directly (or via controlled passageways/pathways) to a packaging station 82 where a container 84 (in this case a paper or plastic material bag) is filled (partially or substantially completely) with expanded product, and where the container is sealed by a sealer 86.

The controller 70 may also control the packaging unit 80.

It will be appreciated that in some embodiments there may be no dust extractor 50, and/or no packaging unit 80, and/or no feed station 16, and/or no material transport system 18 (e.g. batch processes are envisaged as well).

In use, untreated vermiculite of a particular grade (let us say fine, super fine, or micron grade as examples) is introduced into the top of hopper 20 in batches from time to time or in a continuous stream.

The hopper 20 has its outlet value 27 set to "open" by the controller 70 and the conveyor belt 51 is set to run at a certain speed determined by the controller 70, and the microwave generator 30 is powered up by the controller 70 to produce the appropriate microwave power in the treatment zone or region 32 (related to throughput), typically 1 to $12 \times 10^6$ W/m$^3$.

Particles of vermiculite fall in a controlled manner from the hopper 20, down the chute 28 and onto the belt 51 where it forms a generally uniform bed of particles across substantially the full width of the bed. The depth of the bed of particles is material to how well the exfoliation process works for different powers and particle size? Too thin and not enough power will couple into the load (mineral). Too deep and the particles stop exfoliating. We use a depth of about 10-20 mm at 2.45 Ghz. At 915 MHz this would be higher.

The conveyor belt 51 extends into the tunnel 36 and the untreated particles of product (vermiculite in this example) pass beyond the first chute 38 and into the microwave treatment zone 32 where they may experience the microwave field. The water in the vermiculite particles (that is between the layers of material in vermiculite) is heated. This causes the vermiculite particles to expand/exfoliate. As they expand the volume of the particles increases, and the height of the bed increases 5-10-20 times in height, in about 1 or 2 or 3 seconds as the vermiculite particles pass through the treatment region 32.

The expanded product is now at a bulk temperature of about 70° C. (not the several hundred degrees centigrade of prior art furnace techniques). It is then moved along by the conveyor belt 51 to the product discharge station 14 where it is packaged by the packaging unit 80.

The process is a continuous process, in this example. However, the apparatus 10 can be turned off and left unused without damaging it. The dwell time of the particles in the treatment zone 32 can be altered by altering the speed of the conveyor belt 51. The power density can be increased or decreased by changing the input power.

Figure 3:
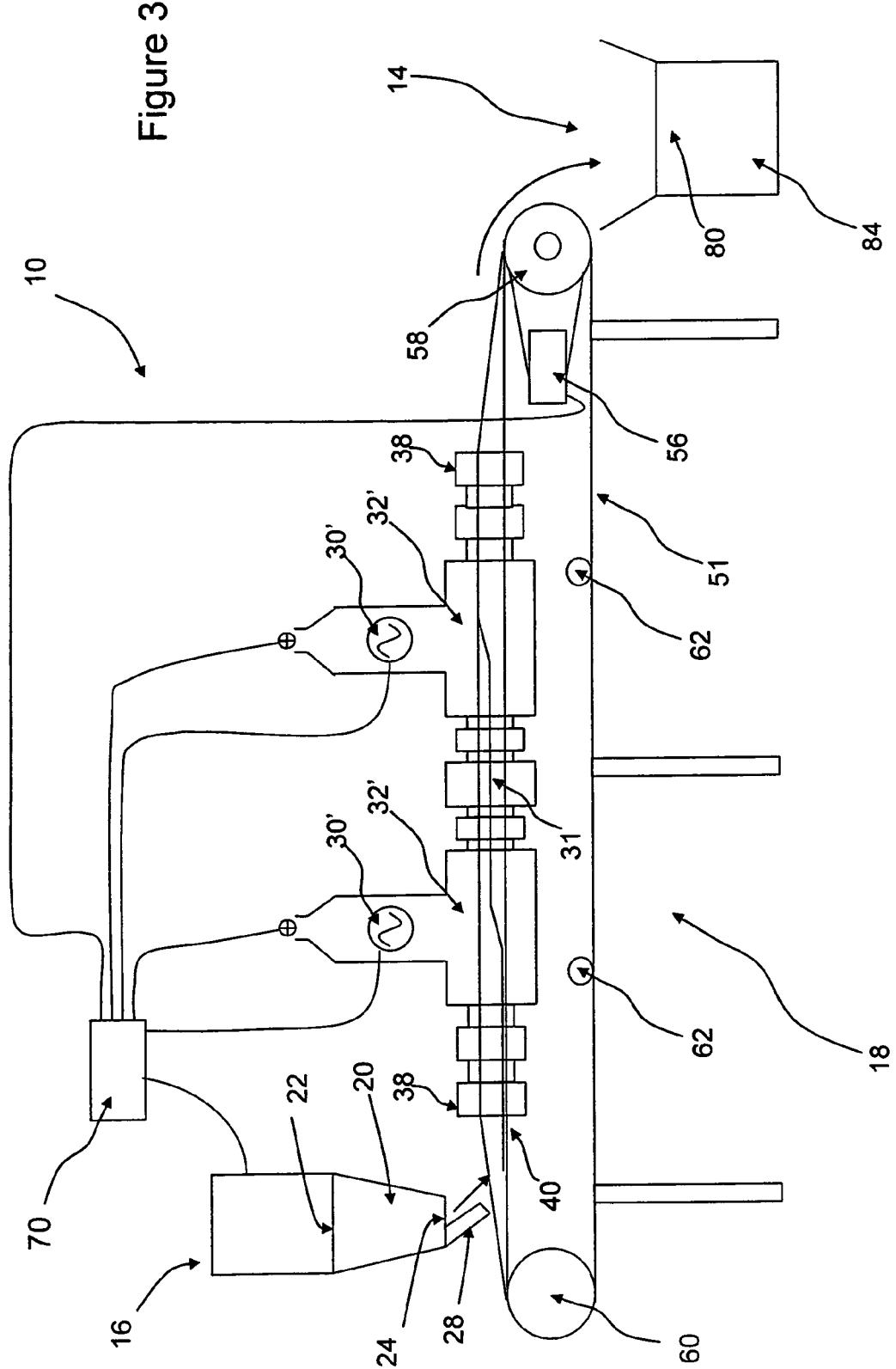
FIG. 3 shows a second embodiment of a microwave exfoliator.

A second embodiment of the expander apparatus is shown in FIG. 3. This is similar to the embodiment of FIG. 2, except that the vermiculite bed is shown referenced 90 and there are two (or in other embodiments a plurality) of microwave treatment zones 32' and two (a plurality) of microwave generators 30'. There is also a filter, referenced 31, between the microwave generators to ensure that they are decoupled and isolated from each other (we do not want conditions to set up a microwave field where too much power is present at a particular generator due to reflections/standing waves). The second, downstream, treatment zone 32' is provided to give a second heating step to the mineral. We believe that there are sometimes advantages in giving the mineral particles time to expand after a first heating step (as they travel between the two treatment zones) before being heated again in a second, later, heating step. This can allow some water vapour to escape, prior to the second heating step.

Figure 5:
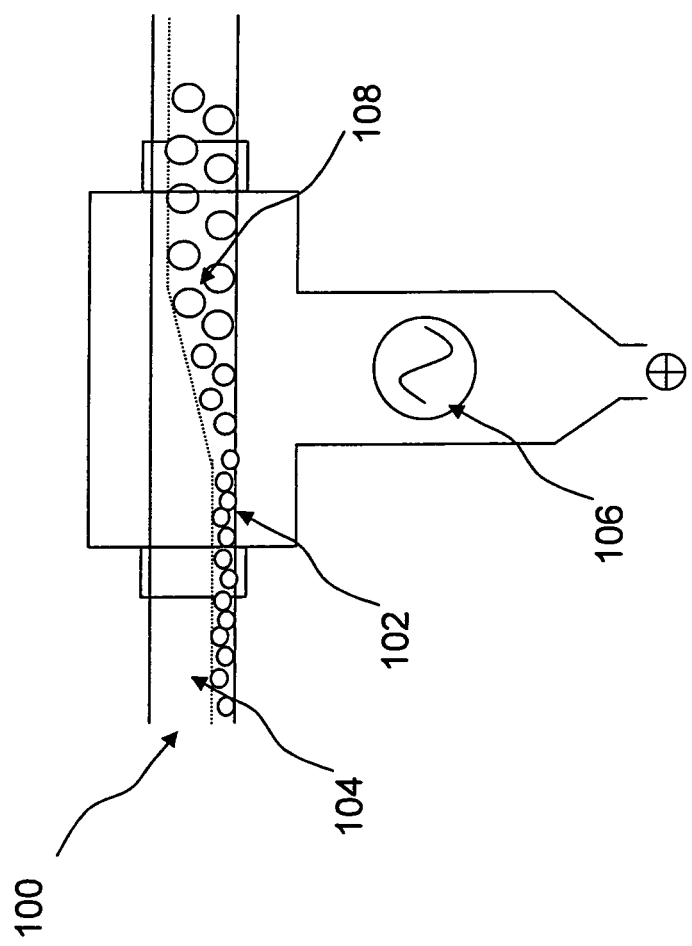
FIG. 5 shows details of another embodiment of an exfoliator.

FIG. 5 shows another embodiment. Here the conveyor belt is referenced as 100 and has a channel or trough shape with a base 102 and upstanding side walls 104. However the microwave power source/generator, referenced 106, is provided beneath the belt. This means that the bed of particles, referenced 108, encounters the microwaves, from the bottom of the bed. As particles exfoliate/expand they grow in volume and have reduced density. Expanded particles tend to rise in the bed, and unexpanded particles tend to fall towards the bottom of the bed, closer to the microwave source. This means that the particles that still need more microwave power put into their water are closer to the microwave generator 106, and those that do not need any more/much more power are further away. This can produce better quality expanded product since more uniform heating can be achieved between particles. There is less tendency to over-cook some particles and under-cook others. This presupposes that the electric field strength of the microwaves will be higher at the bottom of the belt, which it often is because the microwaves have not travelled through so much of the bed and have not had a chance to be absorbed.

The belt 100 may be vibrated to assist the migration of more dense particles to the bottom.

The belt 100 may have a closed cross-section e.g. be rectangle, triangle or loop or ring in cross-section, possibly with dust extraction holes or loops.

We could use an inert atmosphere in the microwave tunnel, at the heating zone. For example, if we wanted to increase the electric field strength of the microwaves to level where arcing in air could be problematic, and/or if the particles, or dust from the particles, was flammable.

The microwave power may be applied from the side of the belt instead of, or as well as from the top and/or bottom of the belt. Applying microwave power from more than one place around the cross-section of the tunnel/belt may also assist in producing a more uniform product.

The belt should have side walls that are deep enough to prevent the expanded vermiculite/product from over flowing off the belt. The height of the tunnel should in many embodiments be large enough to allow for the expansion of the product.

Figure 6:
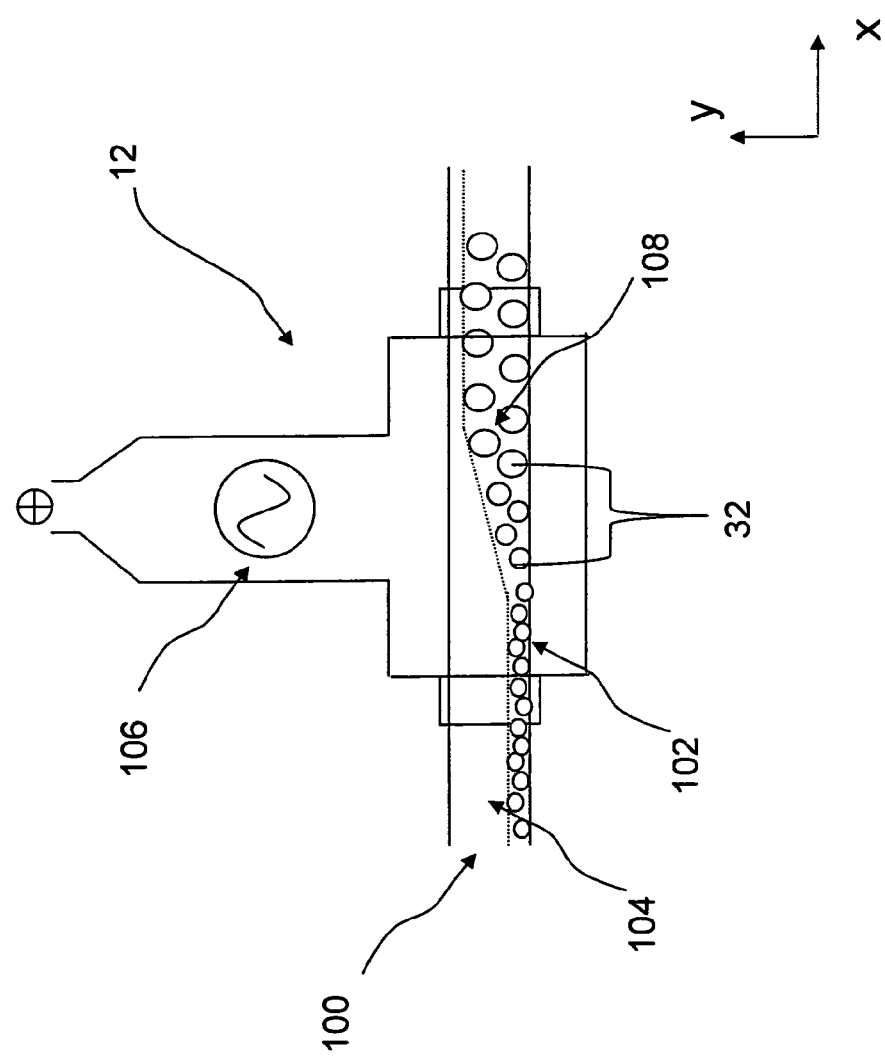
FIG. 6 shows schematic of a microwave applicator (or microwave heating unit) used in embodiments of the invention.

FIG. 6 is a schematic diagram of a microwave applicator (or heating unit) 12, where the microwave radiation is incident on the vermiculite particles 108 from above. The x-y cross axis indicates directions referred to in FIGS. 7 to 13. FIG. 6 also indicates the treatment region 32 where the exfoliating process occurs.

It will be appreciated that the ideas of FIG. 5 can be applied to heating other particles, not just vermiculite, and not just layered minerals with water between the layers (for example, other minerals, or food stuffs etc). this idea of inventing the microwave applicator and applying the microwaves from beneath a feedstock is described in the context of treating oil-contaminated materials (such as drill cuttings, contaminated soils and animal by-products) later, and is a separate invention.

Figure 7:
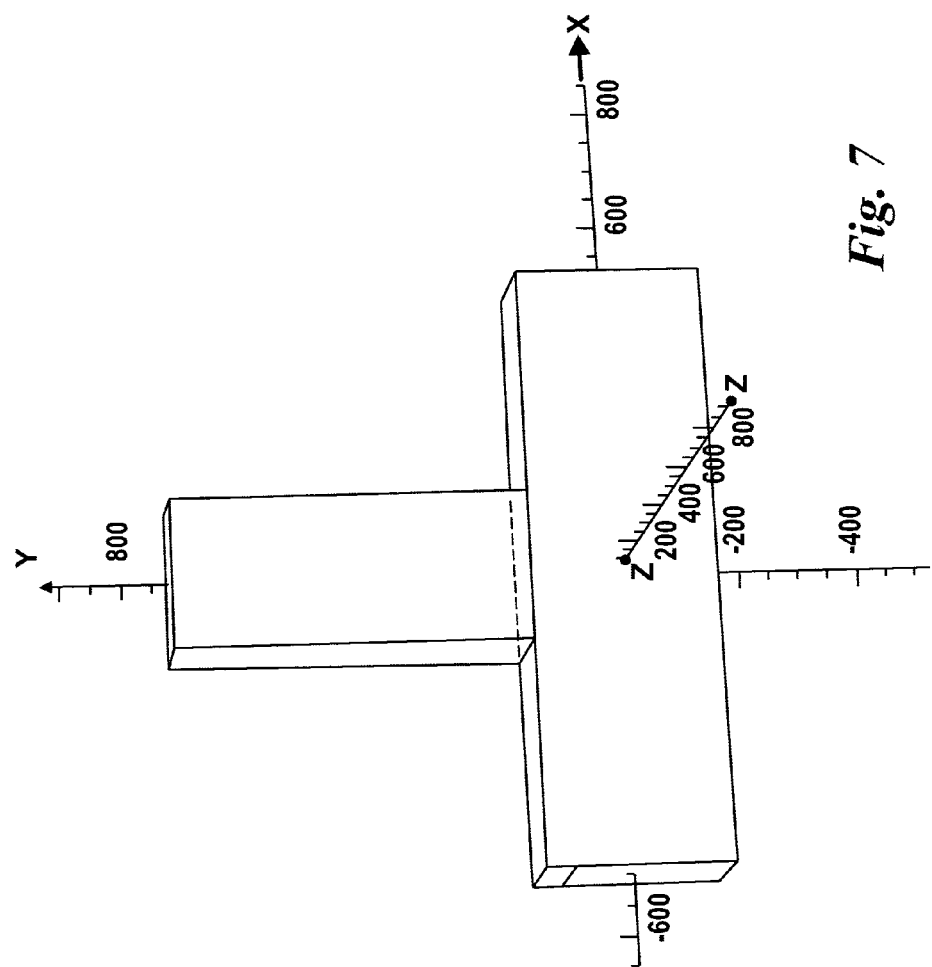
FIG. 7 shows a 3-dimensional schematic of a microwave applicator (or microwave heating unit) used in embodiments of the invention.

FIG. 7 is a 3D model of a microwave applicator (or heating unit). In the examples of FIG. 7 onwards, the applicator has an input power of 100 kW at 896 MHz, and is being used on micron milled vermiculite.

The microwave field intensity that exists in the microwave applicator depends upon the depth of vermiculite that exists in it—we have appreciated that the microwave field is not invariant with depth of vermiculite.

Figure 8B:
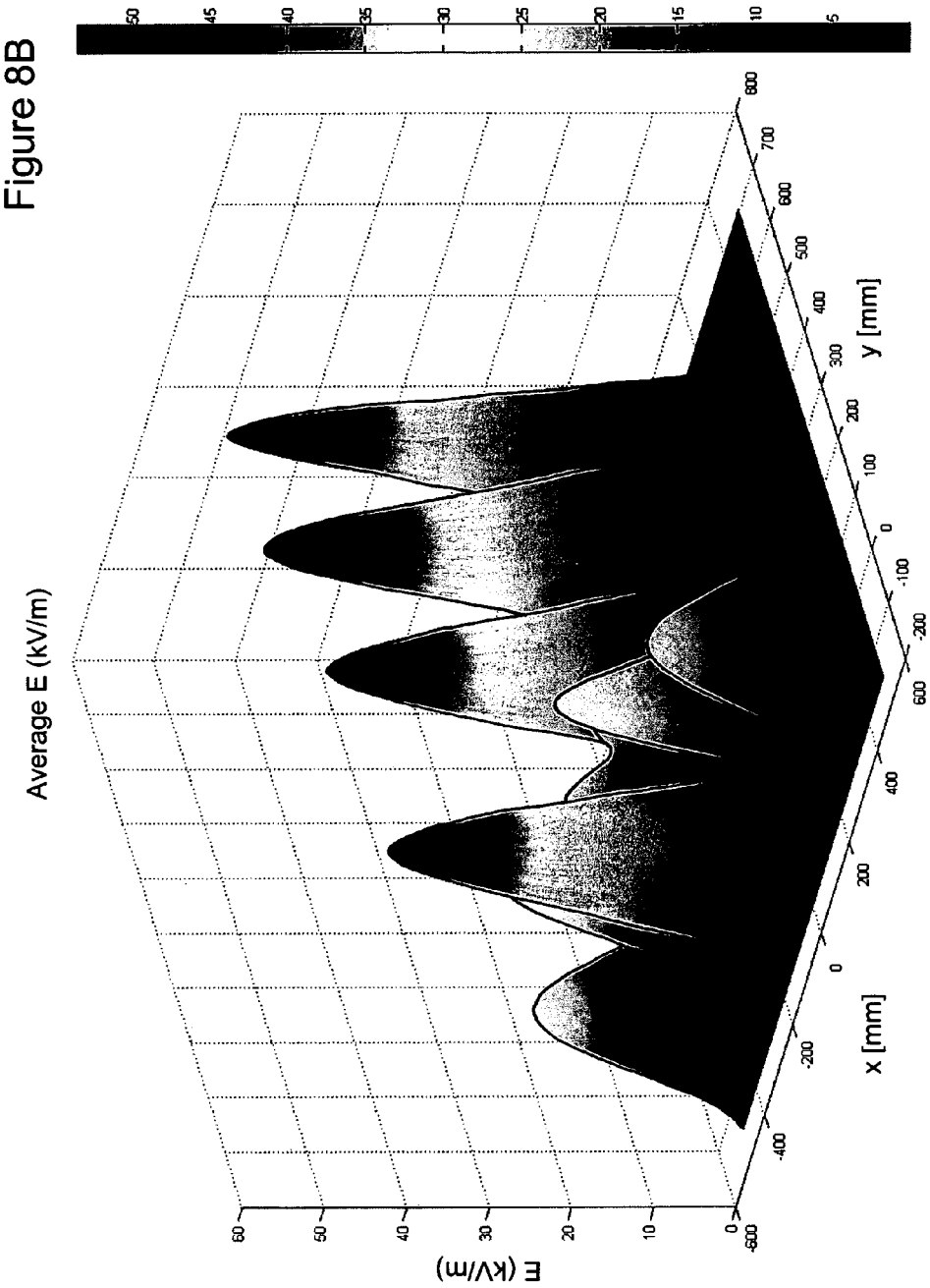

FIGS. 8A and 8B show the average electric field in the applicator, with 100 kw power input at a frequency of 896 MHz, using a vermiculite layer of 30 mm deep.

Figure 9B:
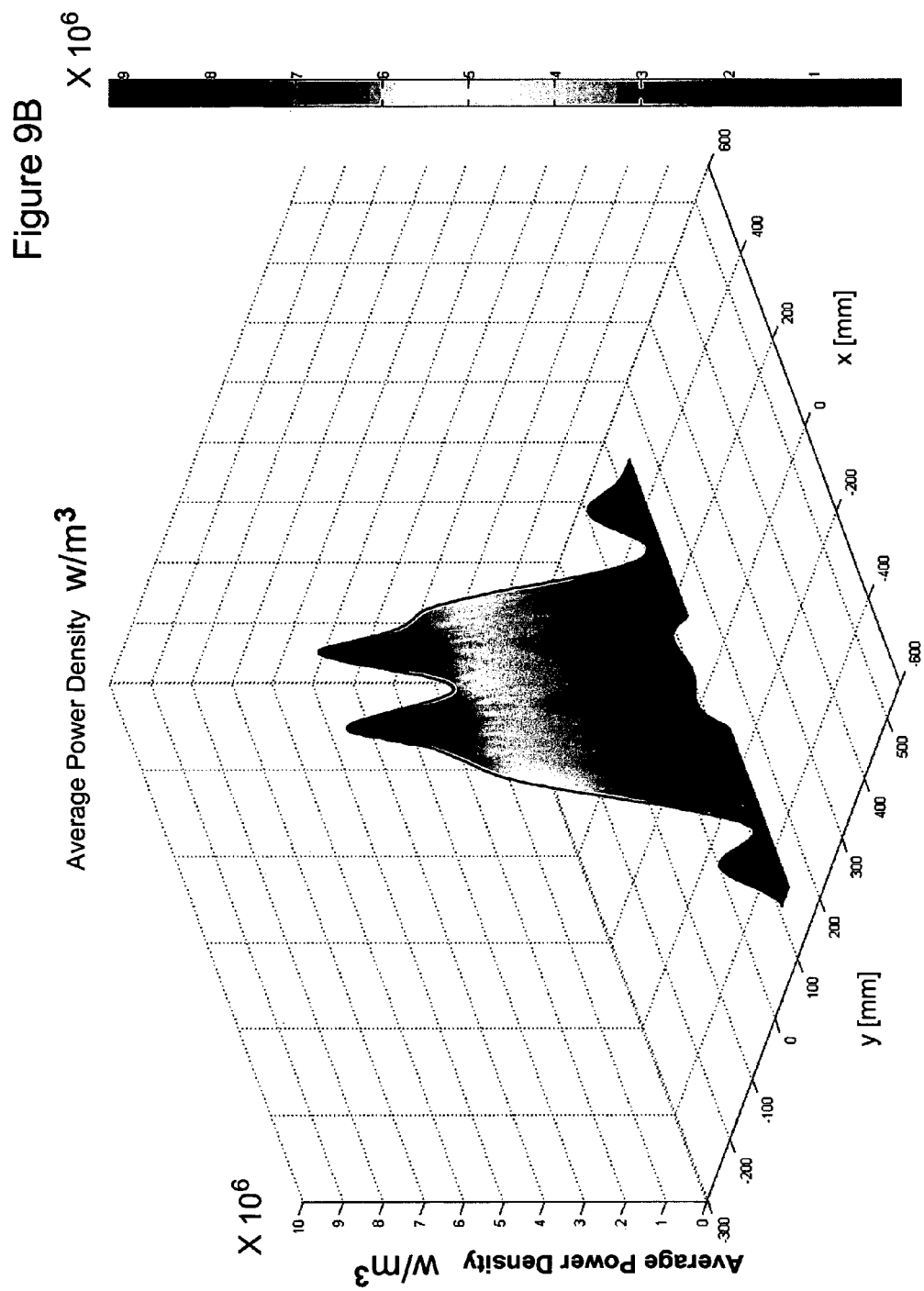

FIGS. 9A and 9B show the average power density in the applicator when the vermiculite layer is 30 mm deep. The maximum power density in the load is approximately $9.2 \times 10^6$ W/m$^3$.

Figure 10A:
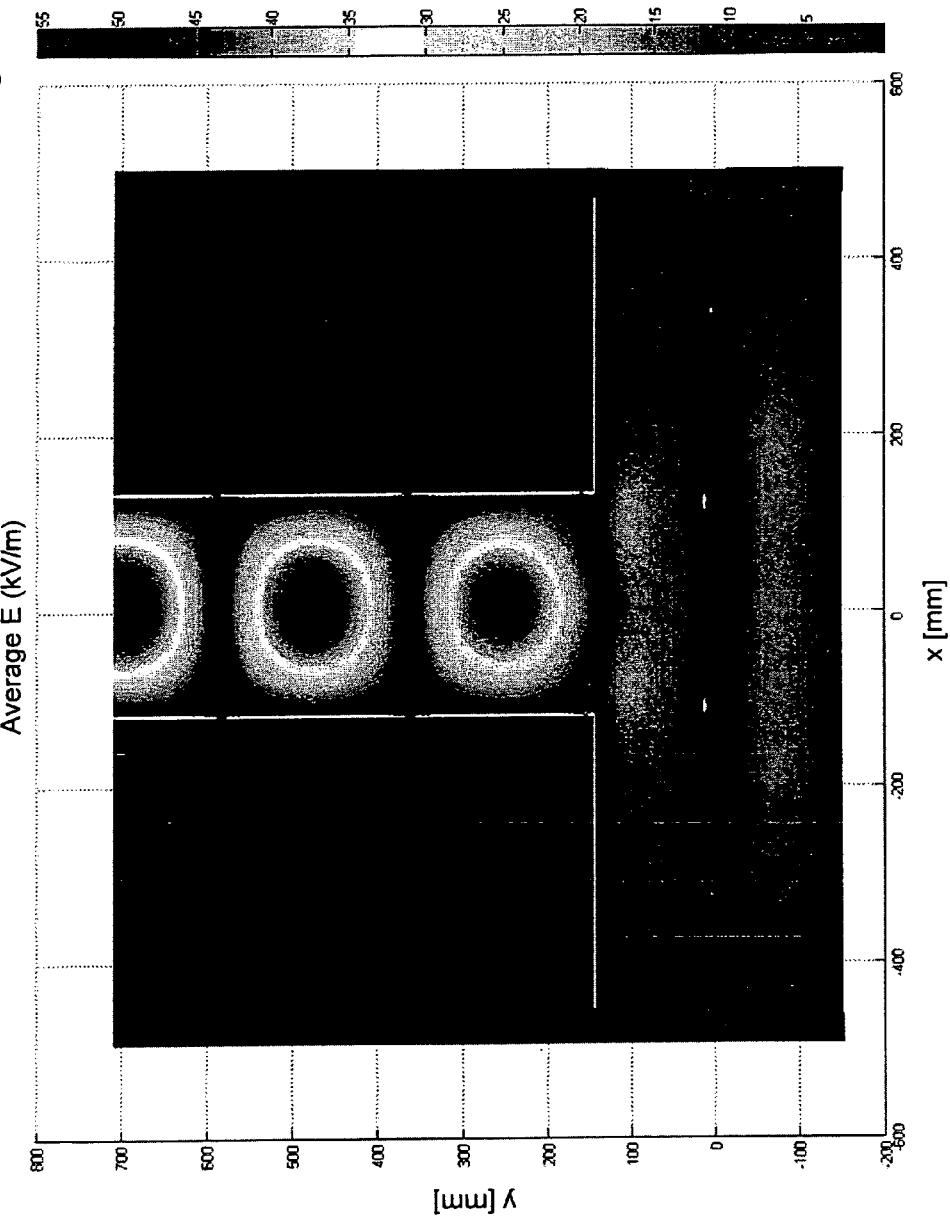
FIG. 10A and 10B show average electric field in the applicator of FIG. 7 with a vermiculite layer 45 mm deep.
Figure 10B:
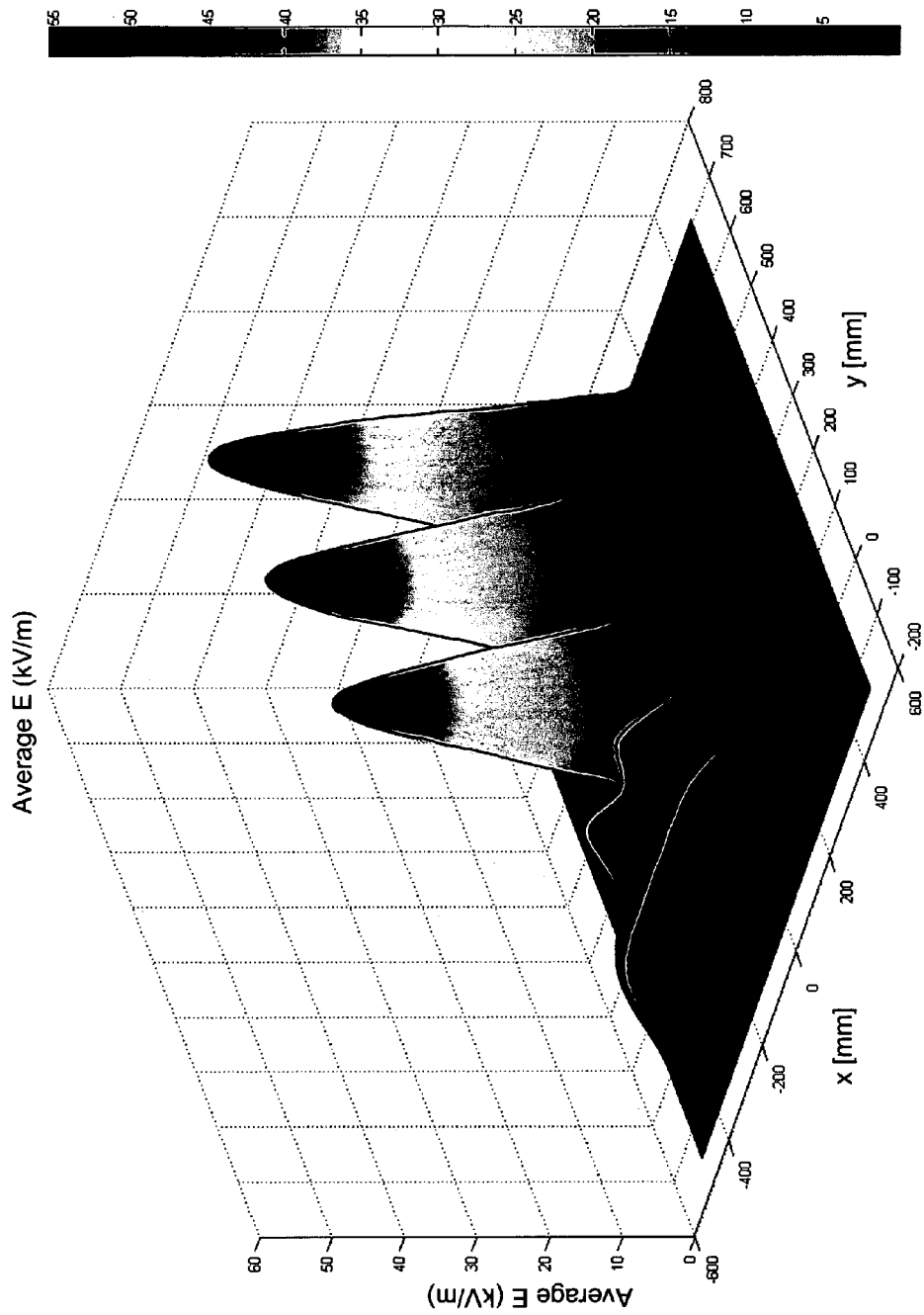

FIGS. 10A and 10B show the average electric field in the applicator, with a power input of 100 kW, at a frequency of 896 MHz, with a vermiculite layer being 45 mm deep.

Figure 11B:
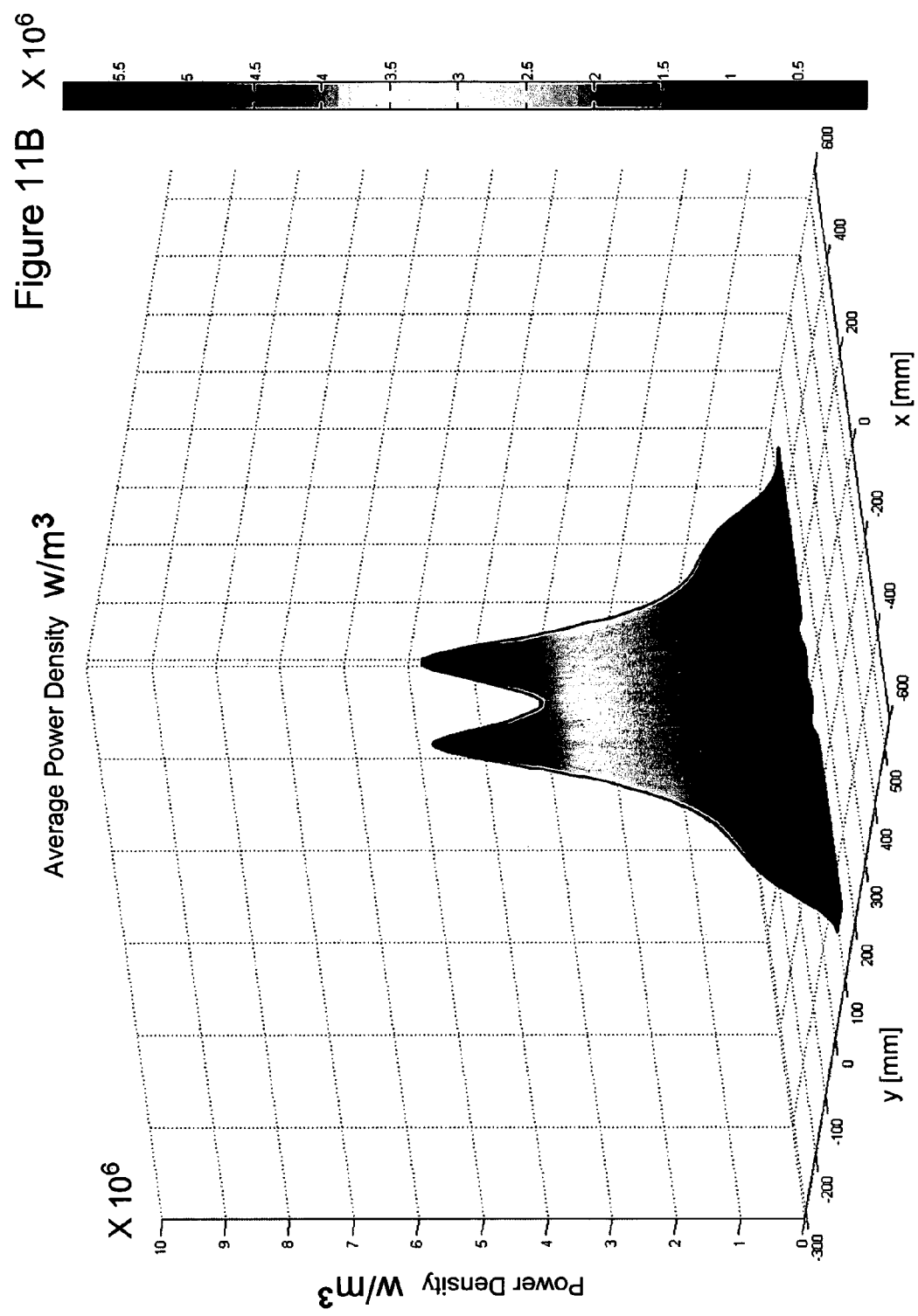

FIGS. 11A and 11B show the average power density in the applicator with a vermiculite layer of 45 mm, and the maximum power density in the load is approximately $6 \times 10^6$ W/m$^3$.

Figure 12B:
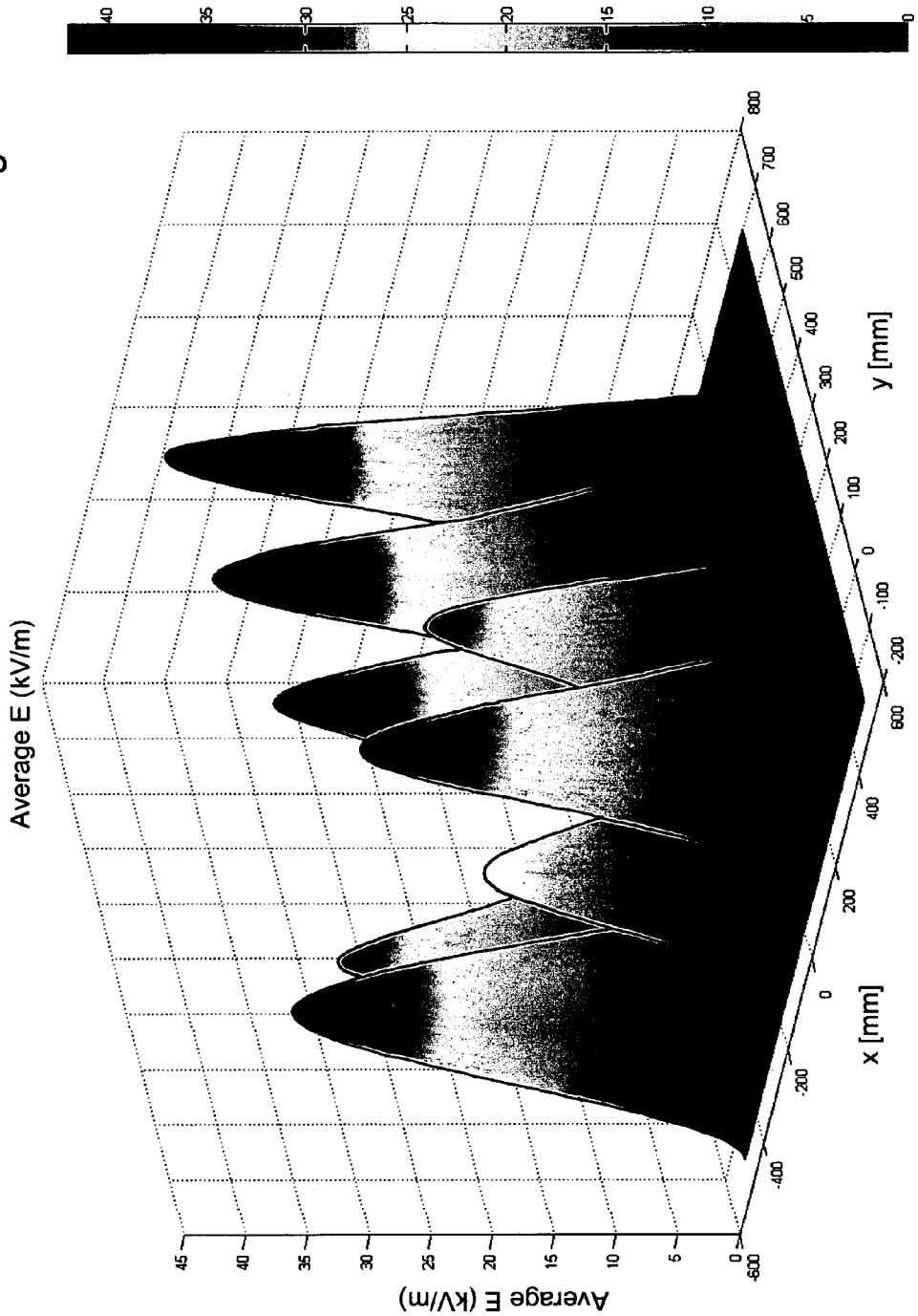

FIGS. 12A and 12B show the average electric field in the applicator with a power input of 100 kW, at a frequency of 896 MHz, and a vermiculite layer of 60 mm.

Figure 13A:
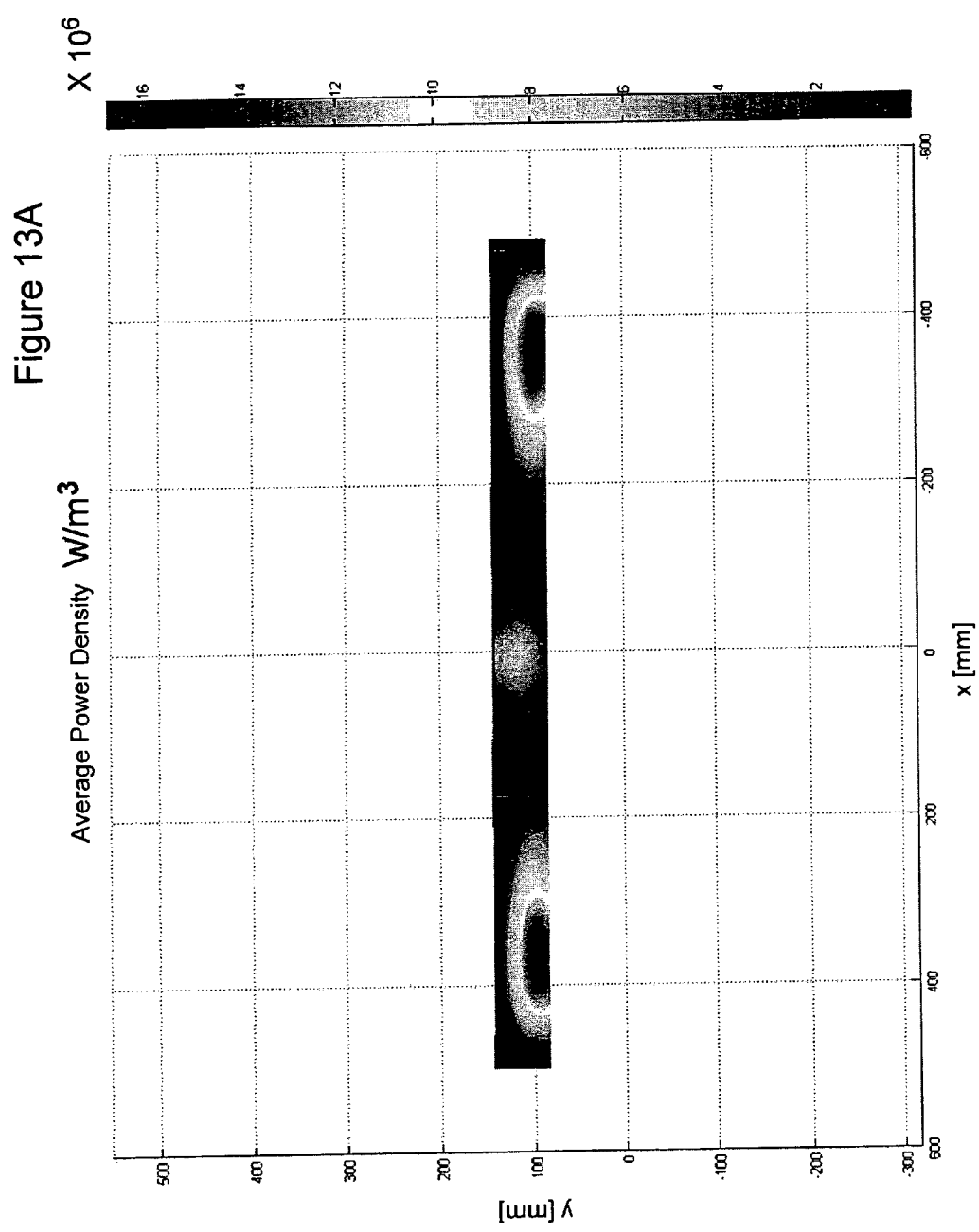
FIGS. 13A and 13B show average power density in the microwave field in the applicator of FIG. 7 with a vermiculite layer 60 mm deep.
Figure 13B:
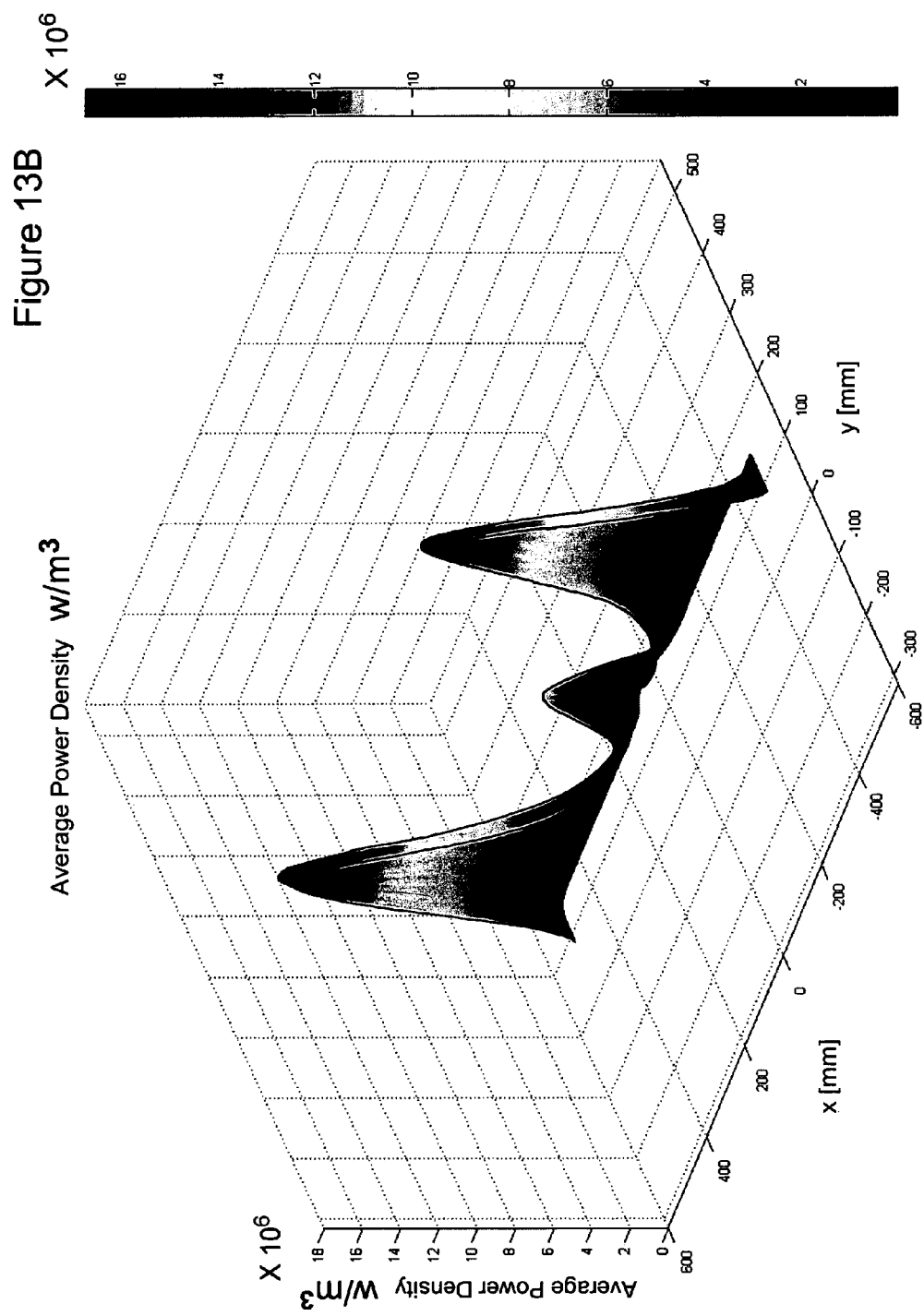

FIGS. 13A and 13B show the average power density in the applicator with a 60 mm vermiculite layer, and where the maximum power density in the load is approximately $1.7 \times 10^7$ W/m$^3$.

One specific embodiment of our system has a vermiculite throughput of 200 kg/hr, a depth of vermiculite on the conveyor of 10 mm, and has microwave power applied: ~25 kW @ 2.45 GHz. This is with fine grade vermiculite. This has a maximum power consumption per unit weight of 150 KWh/t. The exfoliated vermiculite has product characteristics of <95 g/l including grit and fines (~10-20%), which is within industrial specifications. The process has an energy cost (at December 2008 prices) of about £9.50 per tonne processing energy costs, and about £0.095 per 100 liters fine grade product.

We have appreciated that the prior art has been using the wrong approach. The prior art has heated the vermiculite itself (the mineral) so as to cause the water trapped in the vermiculite to expand (vaporise), thereby causing the vermiculite to expand. We have appreciated that it is better to heat the free water in the mineral selectively.

We have also appreciated the fact that the power density in the water phase at the heating zone of the microwave exfoliation plant is important. Too low a power density does not work at all, particularly at small particle sizes.

Our techniques work well with the large, medium, fine, super fine and micron size ranges of vermiculite but particularly well at fine, super fine and micron size ranges of vermiculite. We believe that this is associated with there being a relatively high surface area to volume ratio (compared to large grade vermiculite or medium grade vermiculite). We believe that the smaller particles need a more rapid heating of inter-layer water, and that a higher power density is required for the small particles than is required for larger particles of vermiculite.

Our prototype machine can produce hundreds of kilograms per hour (300 kilograms per hour in our prototype) of fine grade exfoliated vermiculite, and uses a power of around 100 kilowatt hours per ton. We use 30 kilowatts of microwave power at 2.45 GHz in a microwave-powered heating zone. This has lower energy costs than furnace based systems. However, it is to be noted that other frequencies of 896, 915 & 922 MHz may alternatively be used.

We note that our microwave system has a consumption of 50-150 kilowatt hours per tonne, whereas the furnace process has 500-1000 kilowatt hours per tonne.

We also have significantly improved working conditions for the people in the manufacturing plant. There is reduced dust and noise for a person compared with prior art techniques. With our microwave system we can almost completely eliminate dust emissions. This saves us the 400 or 500 kilowatt hours per ton in power spent by prior art dust and hot air handling systems.

Our system can be, essentially, a closed system.

One reason we produce less dust is because the vermiculite is transported on a horizontal conveyor belt in many embodiments of our invention. Particles of vermiculite therefore do not collide with each other as they fall through space, as in the prior art. Also, because the bulk material of the vermiculite mineral is not heated anywhere near as much in our technique, it is not as soft as it otherwise would be and the particles do not break-up so much.

Another significant advantage is that we produce exfoliated product at a temperature of approximately 70° C., at least in some embodiments. This is much lower than the temperature of furnace-produced vermiculite. We can have expanded vermiculite delivered from the exfoliating machine directly into a packaging or bagging machine, rather than having it stand for some hours to cool down.

Our processes are a lot more flexible than the prior art processes. We can start and stop production without damaging the equipment, unlike the prior art. We can run our machine at different levels of capacity—whereas it can be a skilled job in the prior art to alter the flow rate of vermiculite because it alters the temperature in the furnace significantly. We can have automated process control. The controls for our system can be quite simple and operating the machine can be a de-skilled job. To operate the machine we may simply have to press a button, or possibly indicate a grade of the vermiculite being used, and a microprocessor or computer may do the rest. One machine (like ours) can produce vermiculite of different grades, unlike the prior art.

Another major advantage is that our exfoliating machine has a dramatically smaller space-occupying footprint in the factory, both for the exfoliating machine itself and for the gas/handling equipment, compared with furnace machines.

Furthermore, our maintenance costs are far lower, and our down time can be lower. Maintenance of the magnetron is necessary, but we estimate that replacement of the magnetron should take place once every 10,000 hours of operation. Belt lubrication would be needed from time to time, but this is a routine non-skilled job, and cheap.

Moreover, since the microwave exfoliator is inherently quite modular we can envisage a modular system where components can be swapped in and out in order to reduce down time.

Because only the vermiculite is heated, and even then only the inter-layer free water is heated, we have a reduced start up and shut down time compared to prior art furnace systems.

A further advantage is that the actual nature of the expanding vermiculite is more consistent and easier to keep within specification by using our machine. There is the potential for improved product yield and reduced waste.

A further possibility is that we could provide a portable exfoliator machine, and move the machine to different end user sites. We could manufacture the expanded vermiculite at the end point of use or point of sale, rather than have a central facility and then transport expanded vermiculite. For example, we could install a microwave exfoliator in a vehicle, such as a van or lorry.

Another advantageous feature is that we can control the degree of exfoliation/expansion by controlling the time that the vermiculite particles spend in the microwave heating zone and/or microwave heating power—the same particle of vermiculite can be expanded to a greater or lesser degree, depending on the conditions. Whilst this is theoretically true of the prior art systems, it is very difficult to control the time that a particle of vermiculite spends in the heating zone of a furnace. The heating zone of a furnace is not particularly localised and it can be difficult to predict the travel time of particles going through a fluidised bed, driven by gravity downwards with gases rising upwards, in a vertical furnace. It can be possible to have a processing environment that has more consistency for each of the particles in our system.

The invention can also be considered as a:
(i) method of reducing power consumption, or $CO_2$ emitted, in the production of expanded materials, such as particulate minerals, such as vermiculite; or
(ii) a method of increasing the speed of producing packaged expanded minerals/materials from unexpanded materials to packaged (e.g. bagged) expanded materials (e.g. because no waiting step for the materials to cool down, because they do not get so hot anyway); or
(iii) a method of reducing dust handling requirements and/or dust produced and/or dust released to the atmosphere; or
(iv) a method of reducing the physical size of an exfoliating plant; or
(v) a method of producing better quality/more uniform quality exfoliated/expanded mineral/or other product;
(vi) a method of improving the yield of an exfoliation or expansion process compared with using a furnace; or
(vii) a method of reducing noise when expanding a mineral (furnaces are noisy).

According to another aspect of the invention a method of expanding a particulate material comprises forming a bed of the material and heating the bed from beneath.

This causes underlying, lower, particulates of material to expand, and as expanded particles are less dense, rise in the bed. Denser, less expanded, particles then fall closer to the bottom of the bed, closer to the heat source.

We believe that smaller particles take higher power densities in the water phase to make them expand than do larger particles.

We may have a machine with a significantly reduced requirement for cooling and storage. We may also provide a machine with automated process control to maintain product quality, and for the production of different grades of expanded product.

In addition to having a reduced space for the manufacturing plant, we do not need space for the storage of a pile of particles as they cool down.

A further application of our inverted microwave applicator has been realised. The inverted microwave applicator approach has additional surprising benefits.

In addition to vermiculite expansion, we have been interested in the use of microwaves for other materials processing operations, including extracting minerals from rocks by using microwaves to cause differential heating of different phases of a multi-phase ore, and also in using microwaves to remove oil from rocks and mixtures (for example to clean up oil-contaminated drill cuttings (OCDC) in the oil exploration industry, and recovering oil from shale). We have surprisingly found that having an inverted microwave applicator (positioning the applicator beneath the material being microwaved instead of above it) has unforeseen benefits, and hence, the invention may have wide application as a general platform for waste treatment.

The additional inventions were made during work on OCDC. The contents of our earlier patent application (WO 2008/059240) are hereby incorporated by reference. The reader is directed to read WO 2008/059240 at this point. This will help to get the full disclosure of the material that follows.

Figure 14:
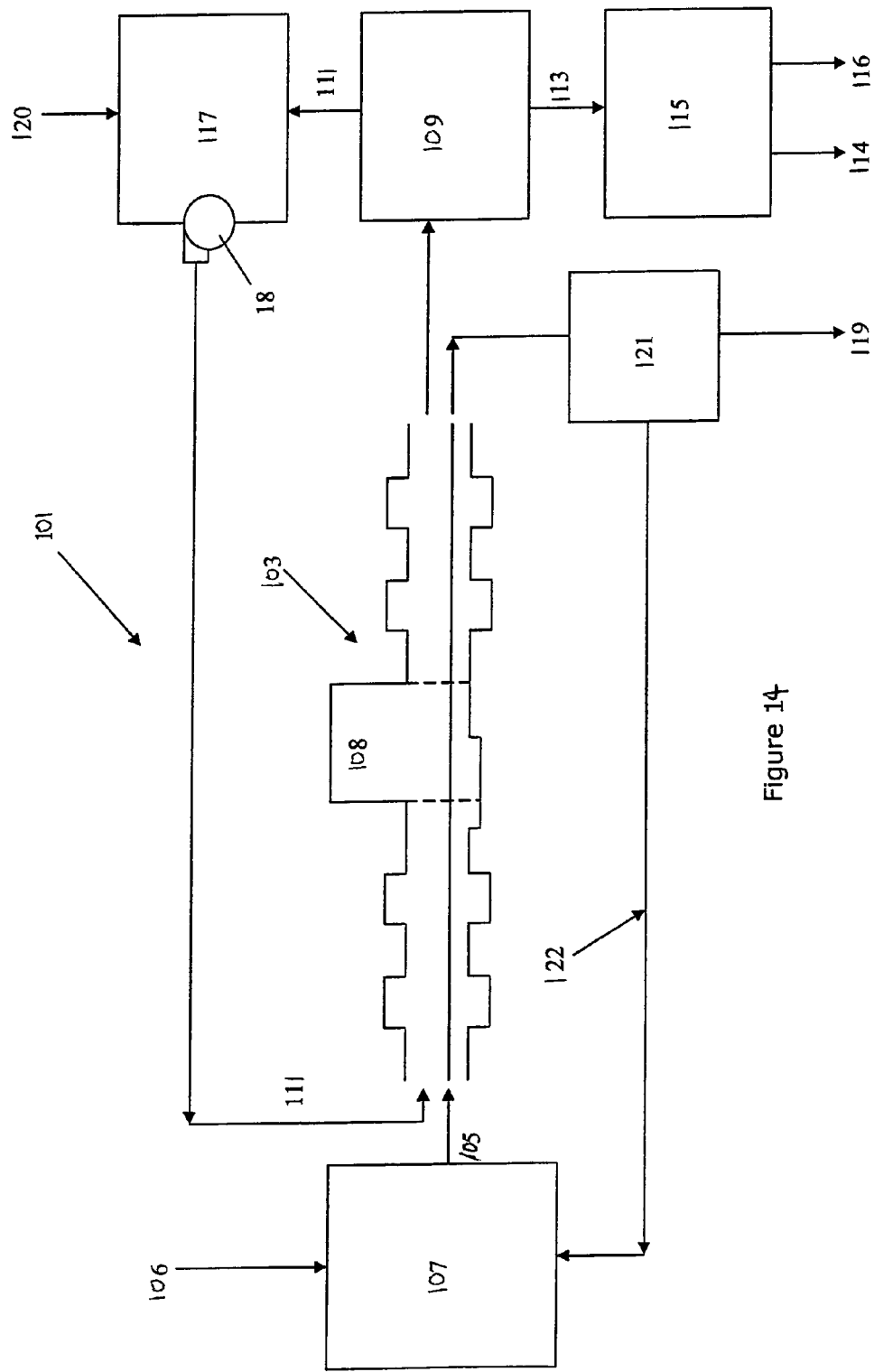
FIG. 14 shows a prior art arrangement of a tunnel microwave processor for removing oil from oil-contaminated materials, such as drilling cuttings (OCDC) or soils etc., and generally for hydrocarbon contaminated matrices.

FIG. 14 shows an overview of a system 101 for continuously separating oil from oil-contaminated drill cuttings on an offshore oil/gas exploration rig. The system comprises feed means 107 (or a material feeder 107) for feeding a feed material 105 comprising untreated drill cuttings 106 (which comprise a mixture of water, oil and rock) into a microwave treatment cavity 103. Condensing means 109 is provided adjacent the outlet of cavity 103 and is arranged to separate an inert purging, or sweep, gas 111 from a recovered oil and water mixture 113. A separator 115 is provided to separate the mixture 113 into oil 114 and water 116. An extraction or recirculation system 117 is provided to filter and clean the gas 111 and to return it to the feed inlet 112 of the microwave cavity 103. The extraction system 117 comprises a pump 118 to pump the gas 111 through the cavity 103, and a clean gas inlet 120, for introducing new gas to the recirculated gas. A feedback system 121 is provided to feed treated cuttings 119 back to handling system 107 as dry, treated material 122.

In use, the feed material 105 is fed into cavity 103 on a conveyor 110, e.g. a conveyor belt. The feed material 105 is exposed to microwave radiation in a treatment area 108 (bounded by broken lines), which (as is described in more detail below) causes rapid and preferential heating of water within the feed material. This in turn causes thermal desorption of the oil component of the feed material, leaving substantially oil-free solid treated drill cuttings 119. The gas sweep 111 passing through the cavity 3 aids vapour removal to the condenser 109. Oil recovered by the condenser can be recycled into drilling mud (which may require the addition of some additives) whilst the treated solid material 119 is suitable for disposal (or for a feedback "dry" material 122 for blending back into the feed material 105 to control its water content). Treated material has less than 1% by weight of material on the conveyor of oil and can be disposed of directly into the sea.

A throughput of 5 to 10 tonnes/hour can be achieved, but a throughput within the range of 250 kg/hour to 1 tonne/hour is satisfactory for most offshore rigs. These sorts of performance can be achieved with a microwave generator having a power of around 100 kW, with a power density of over 1 W/mm$^3$ ($10^9$ W/m$^3$). The system is small and compact, allowing it to fit easily onto a rig despite the restricted space. An industrial scale model could be simply freighted in an ISO freight container. The exact process footprint is variable as the system can be arranged in a large number of ways due to its modular nature, e.g. it could be arranged vertically with minimal use of a horizontal conveyor. The feed system could also be relatively far away from the treatment cavity. This flexibility makes it particularly useful on an offshore rig.

The composition of the feed material and the intensity and uniformity of the electromagnetic radiation (which depends at least in part on the shape of the microwave cavity itself), both influence the effective removal of oil. The feed material preparation and feed system 107 and the electromagnetic treatment cavity 103 are both engineered to ensure that contaminated material is consistently and uniformly treated. The means for the removal of evolved gases and vapours, optionally to allow those gases to be recovered and recycled is considered separately inventive.

We have determined from experimental trials that the performance of the system is dependent upon the physical characteristics of the feedstock on the conveyor belt 110. Variations in dielectric construct $\in$ (e.g. due to variation in water content) can alter the performance.

Variations in the depth of the feedstock on the conveyor belt can alter the performance of the system to a surprising degree.

One solution is to compensate for such sensitivity by controlling dynamically one or more of (or all of): the speed of the conveyor belt; the height or distribution of feedstock on the conveyor belt, the power applied by the microwave applicator, the dielectric properties of the bulk material that is the feedstock.

However, microwave applicators cannot easily, and quickly, react in real time to change their total power output, or their output peak power density or the peak output field strength achieved.

Figure 15:
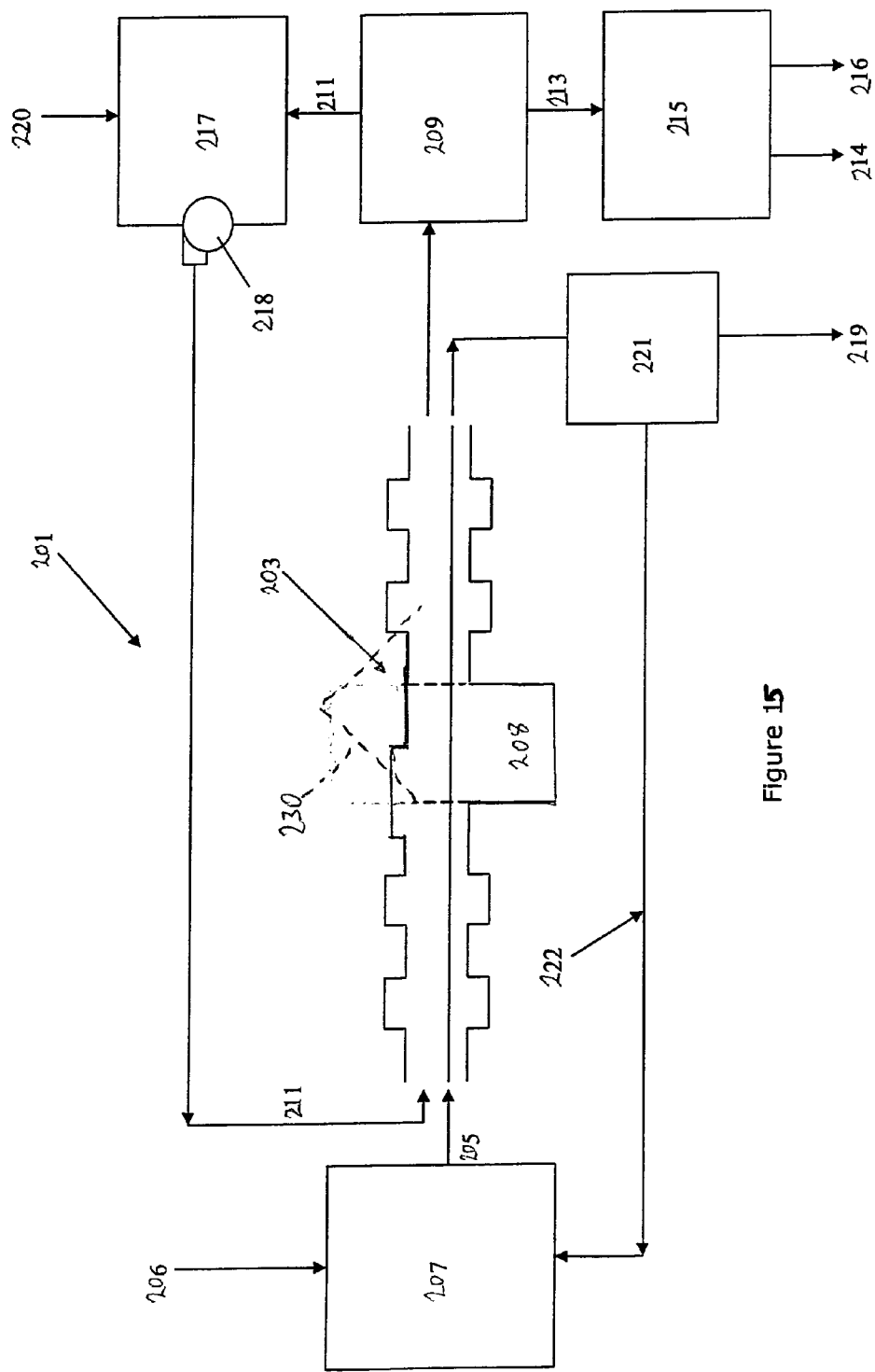
FIG. 15 shows a tunnel microwave processor in accordance with another aspect of the invention having its microwave application below its conveyor belt.

FIG. 15 shows another OCDC treatment system 281. Similar components are given similar reference numerals. This time, the microwave applicator 208/microwave cavity is beneath the conveyor 205.

We have surprisingly discovered that this reduces the sensitivity of the system to variations in height of feedstock on the conveyor belt, and reduces the sensitivity of the system to the bulk dielectric properties of the feedstock (i.e. its water content).

Also, by having the microwave application not on top of the belt (e.g. below it), it makes handling and removal of the evolved (often hot) gases and vapours easier. An evolved gas/vapour removal system 130 is shown in FIG. 15. This sinks away gaseous materials released by the feedstock during their microwave treatment.

We have realised that there is an impact of feed dielectric property variations on the operational efficiency of a reflection step applicator for the microwave processing of oil-contaminated drill cuttings (and other materials). The step microwave applicator previously developed is effective at reducing the oil content of feed material when operated within a narrow range of water contents, but less effective at more widely varying water contents. This problem is overcome by blending the feed cuttings with dry material with the overall effect of reducing the overall water content. However, that may not be possible in some applications (no blending performed) or it may not be enough on its own to handle a wide enough variation in dielectric properties of feedstock material. This has resulted in a re-designed applicator to make it simpler to operate in terms of sensitivity to feed material and the ability to support higher power densities in the heated phase at identical power inputs.

A finding from our experiments has been that variations in the feedstock dielectric properties can only be tolerated if a high power density is used (typically of the order of $1\times10^6$ W/m$^3$). However, it is to be appreciated that the actual power density required may be dependent on the particular feedstock being treated and/or the particular application. Hence, the power density may be different for treating drill cuttings, contaminated soils and other wastes etc. To achieve the required power density throughout the depth of a variable material poses a considerable challenge in the development of the process control systems needed to dynamically vary bed thickness, ride height of the belt in the microwave tunnel, and forward power (as well as possibly blending dry feed to give a coarse level of control over moisture content). These challenges have been overcome by redesigning the applicator so that the feed position is inverted. This configuration provides the additional benefit in that it better facilities hot steam and gas handling directly above the treated material, which in turn improves reliability of power delivery. We have shown that the power density in the new inverted applicator design can, at least in the embodiment we have studied, be up to 29% higher for the same power input in addition to being less sensitive to feed properties. This makes it more suitable for offshore use.

Figure 16:
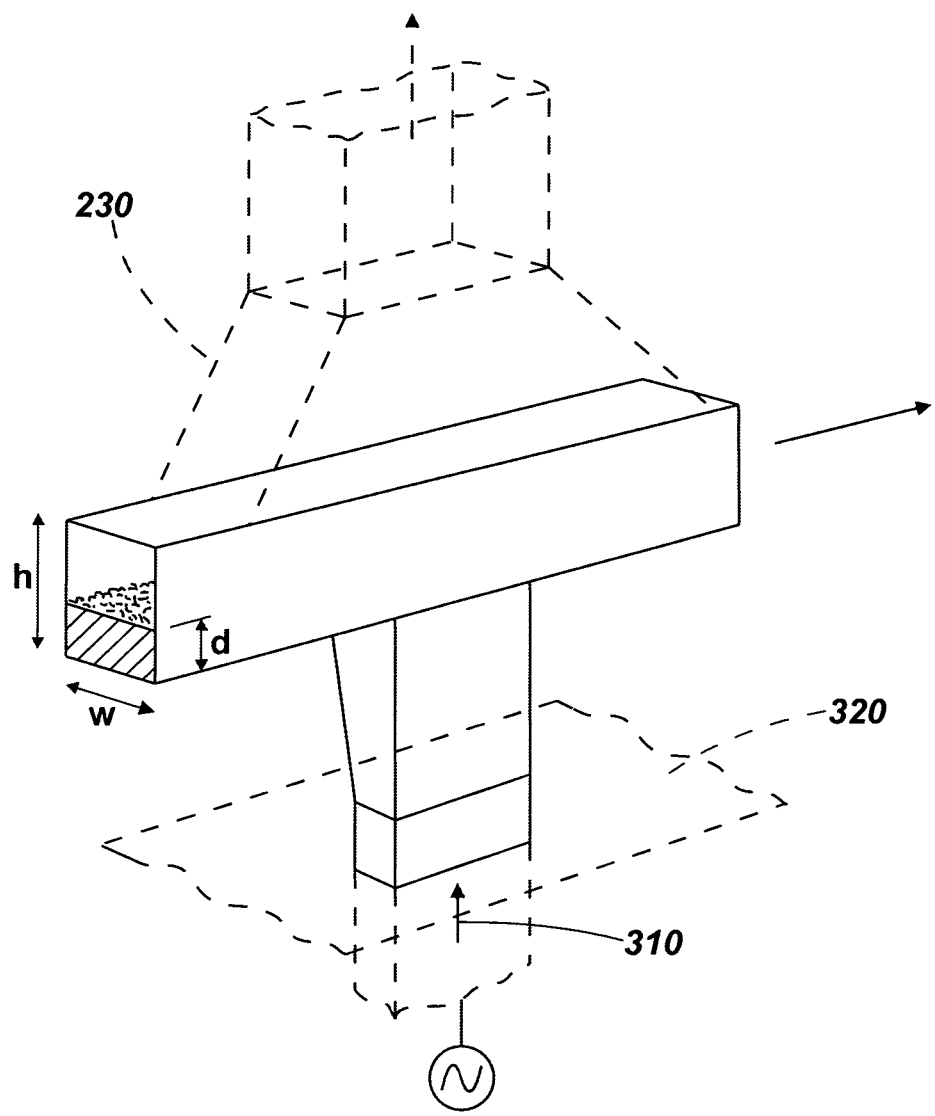
FIG. 16 shows the microwave applicator arrangement of FIG. 15 in more detail.

FIG. 16 shows the inverted microwave applicator of FIG. 15 in more detail. The input power of microwaves at microwave guide 310 is 30 kW at 2540 MHz. The conveyor belt is made of basalt, 3 mm thick (this has good, transparent, microwave properties). The width of the microwave tunnel (w on the Figure) is 100 mm, as is the height h of the tunnel. The depth, d, of the OCDC cuttings is 40 mm. The drill cutting shave about 5% waver content and have an $\in'$ of 7, and an $\in''$ of 1.9.

Figure 17:
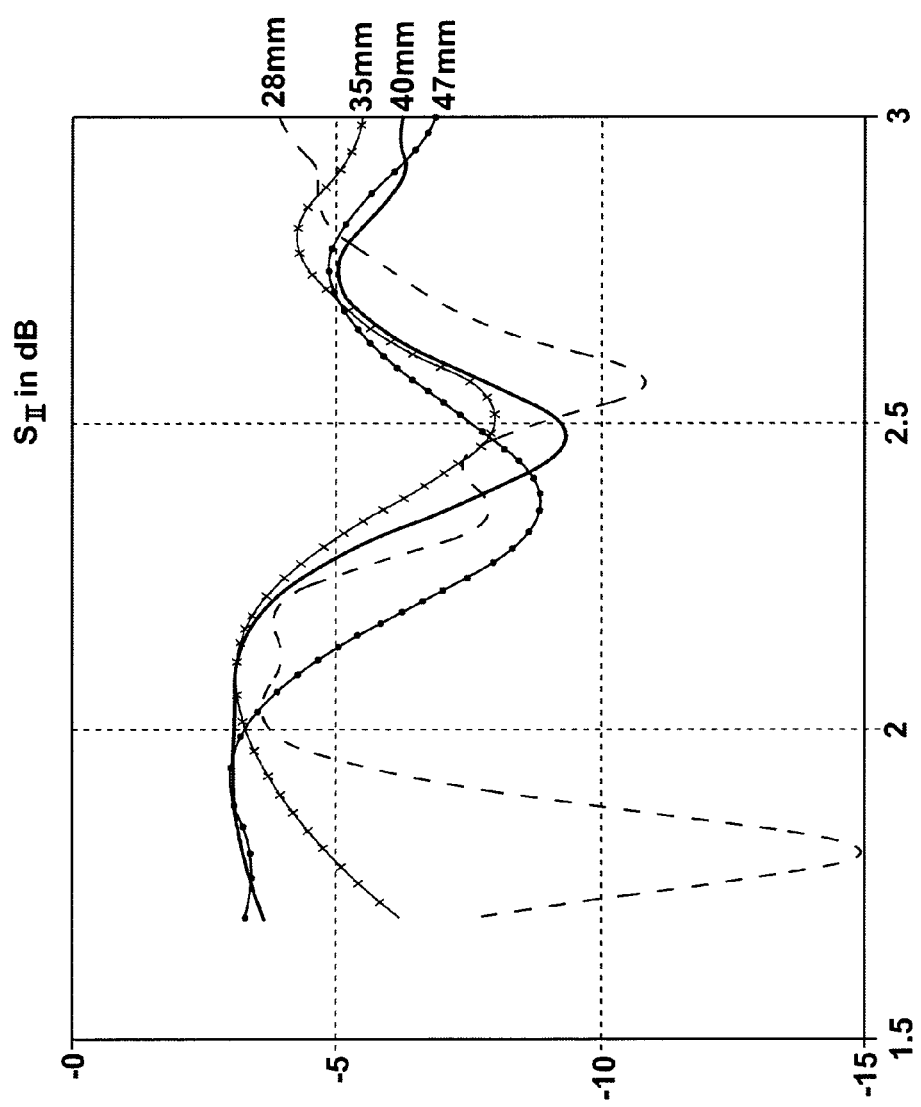
FIG. 17 shows the variation in $S_{11}$ (ratio of forward to reflected signals at 2.45 GHz)

FIG. 17 shows the variation of $S_{II}$ (the ratio of forward and reflected signals) at the input (left) port of FIG. 16 with microwave frequency for different load thicknesses.

As an optimization parameter, the desirable value of the $S_{II}$ at the frequency of 2.45 GHz (the microwave applicator frequency) needs to be as low as possible and the return loss peak as broad as possible. This equates to a lower quality factor and thus less reflected power from the applicator which results in better matching during the process which in turn leads to better process overall efficiency. Hence, the SII value provides us with a valuable indicator of how well matched the system is (in order to minimise reflected power), while a broad peak means that the system is less sensitive (i.e. more robust) to changes in frequency and material properties.

Another parameter that needs to be considered at this stage is the effect that the bed height may have on the material throughput.

As apparent from FIG. 17, the selection of a 40 mm bed height is a good compromise between minimising reflection from the applicator and achieving high throughput.

Figure 18:
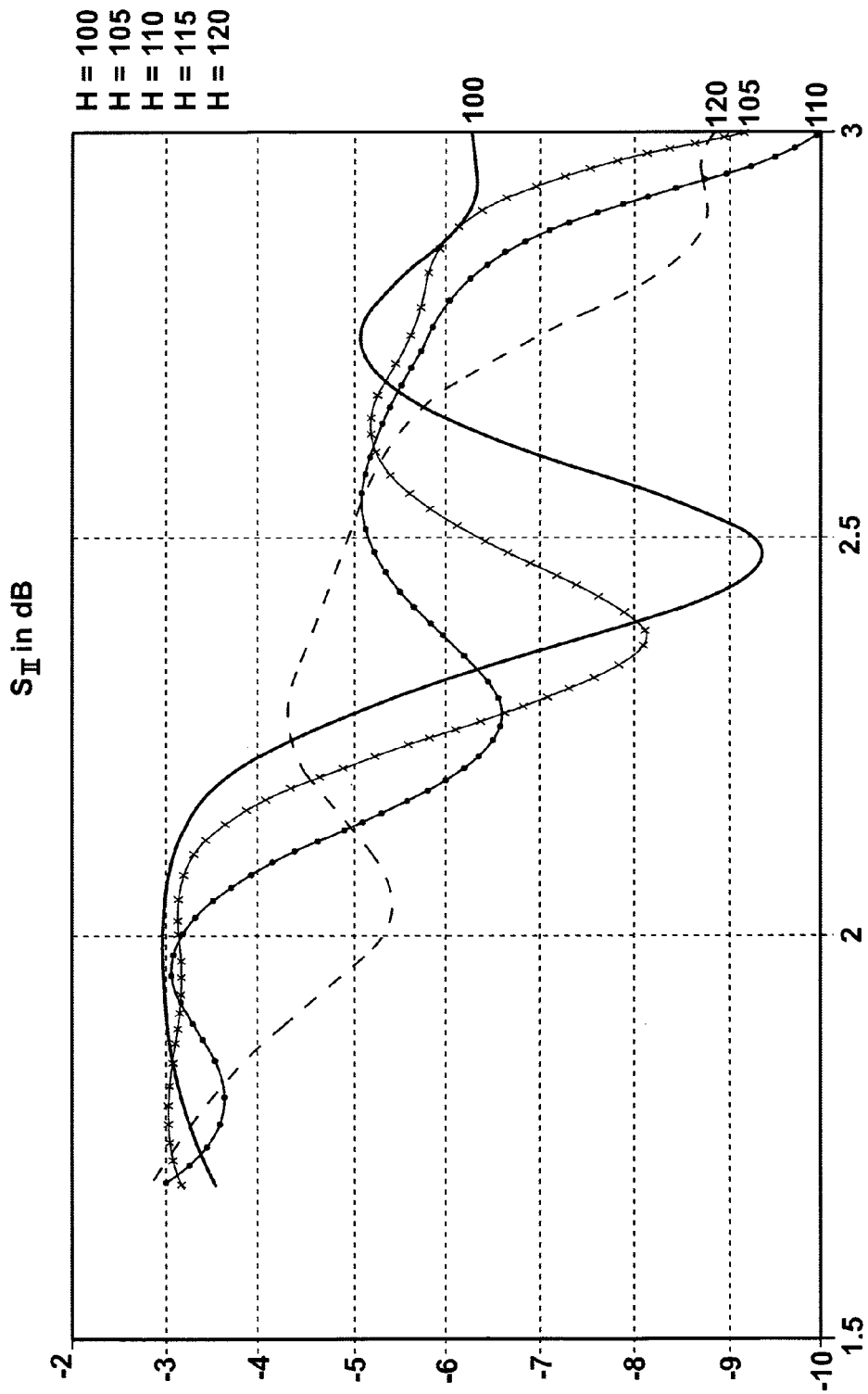
FIG. 18 shows the variation of $S_{11}$ with applicator heights for different frequencies, with a fixer load height, for the arrangement of FIG. 15.

FIG. 18 shows the $S_{II}$ parameter versus frequency for different cavity heights of the microwave applicator. It is apparent that the best performance of the applicator in terms of tuning at the frequency of 2.45 GHz is going to be achieved for a height of 100 mm.

Figure 19:
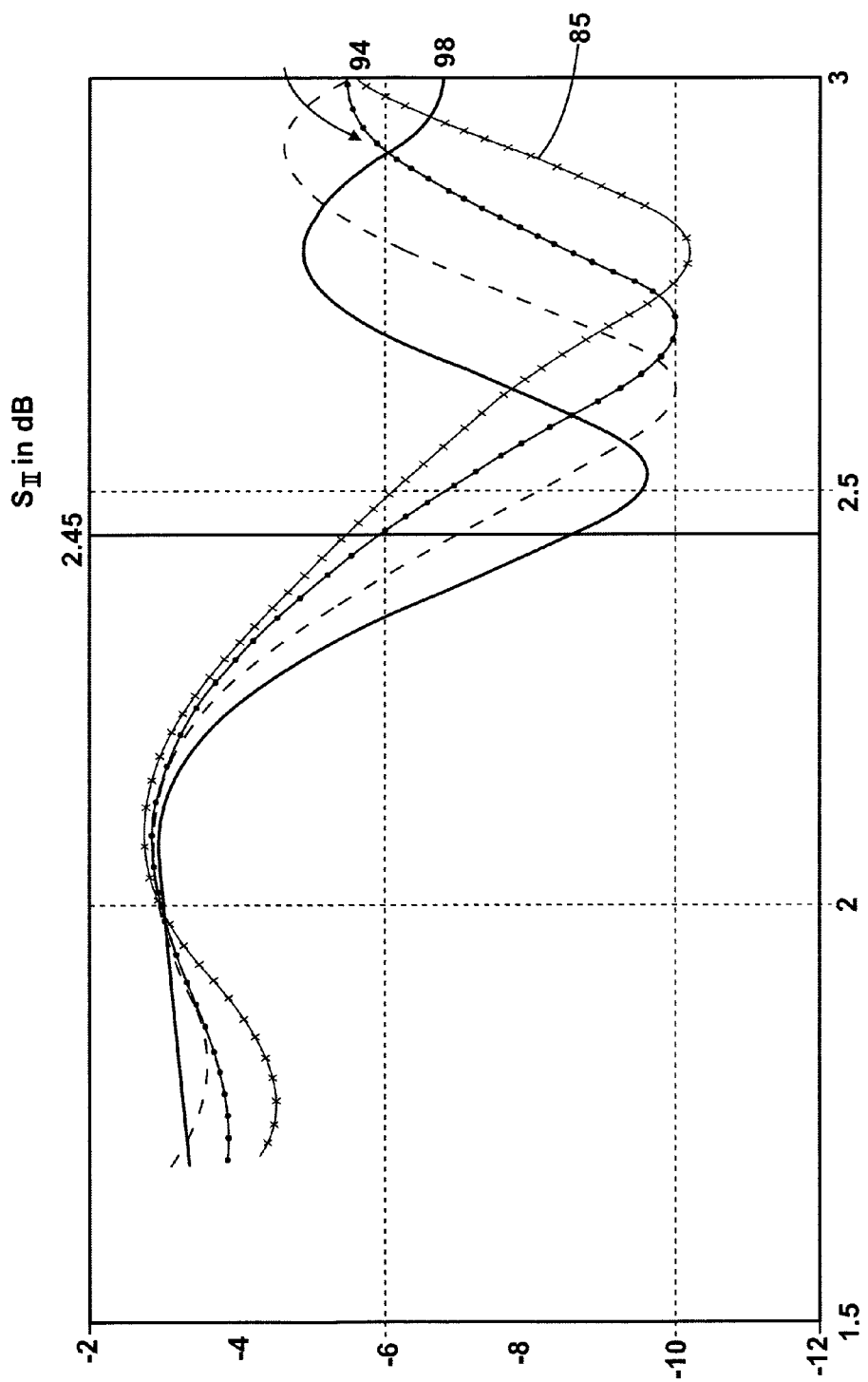
FIG. 19 is similar to FIG. 18, but for applicator heights that are less than 100 mm.

In a similar fashion, FIG. 19 illustrates the $S_{II}$ parameters of the applicator versus frequency for cavity heights less than 100 mm. From the Figure, it can be concluded that as the cavity height decreases the minimum of the return loss shifts height than 2.45 GHz, thus decreasing the overall performance of the applicator in terms of tuning.

FIG. 19 shows the variation of the $S_{II}$ parameter versus frequency for different applicator heights for heights less than 100 mm (the load height is 40 mm, the basalt belt thickness is 3 mm and the width of the applicator is kept contact at 100 mm).

Thus, from FIG. 17, FIG. 18 and FIG. 19, it can be concluded that the optimum dimensions of the applicator (at 2.45 GHz) are 100 mm for the width and the height, and 40 mm for the height of the load. For these dimensions, the return loss has sufficiently low values to facilities easy tuning of the applicator, also the applicator operates with a low quality factor, which essentially translates to robustness in terms of its frequency response and ease of power coupling. It is well-known that a magnetron microwave device does not produce a clear signal in terms of its frequency output and that the signal often has a bandwidth of a few MHz, which can often make tuning very problematic. An applicator with low quality factor can compensate for the bandwidth and operate successfully across this frequency range.

Figure 20A:
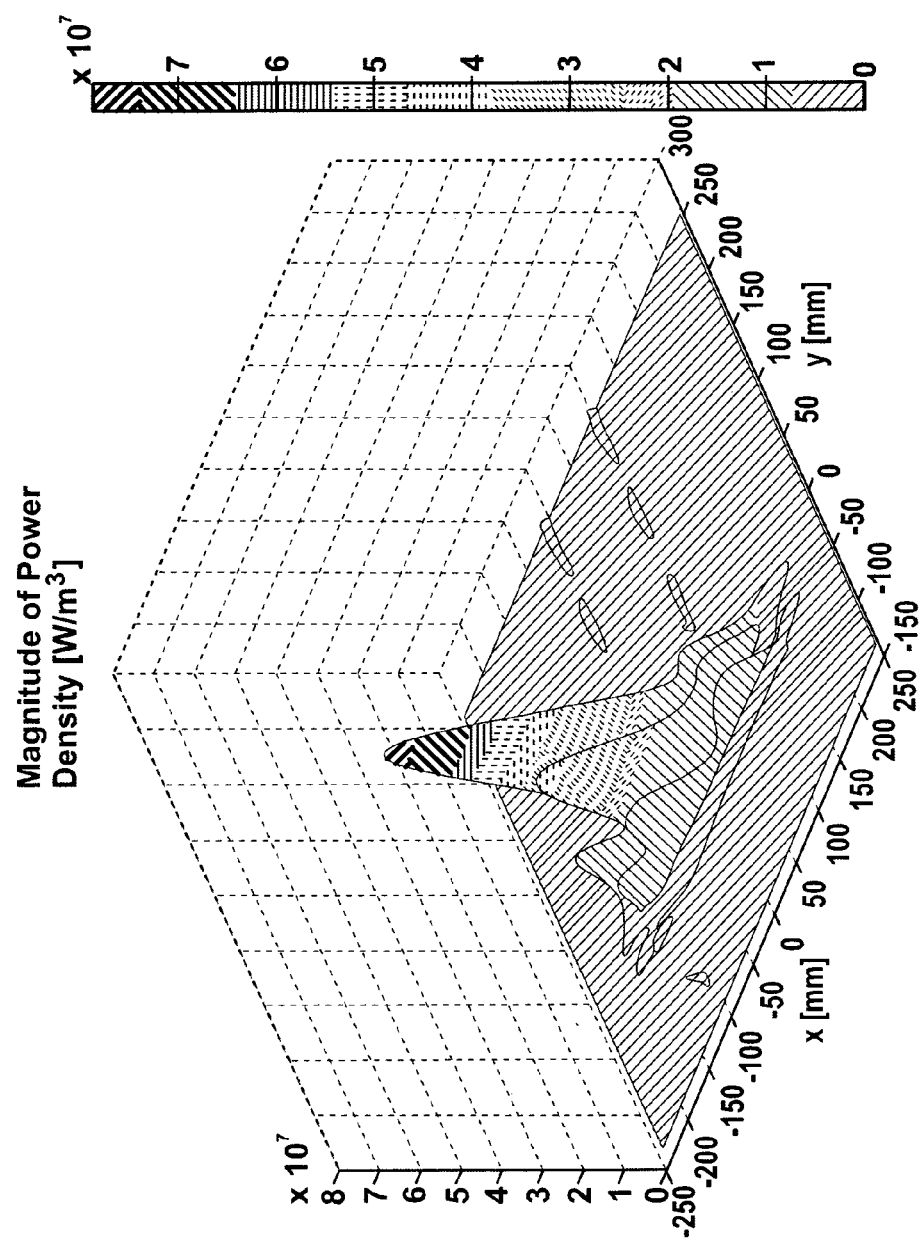
FIGS. 20A and 20B show a comparison of the application of FIG. 14 and that of FIG. 15, and illustrate a significant increase in power density achieved in the arrangement of FIG. 15.
Figure 20B:
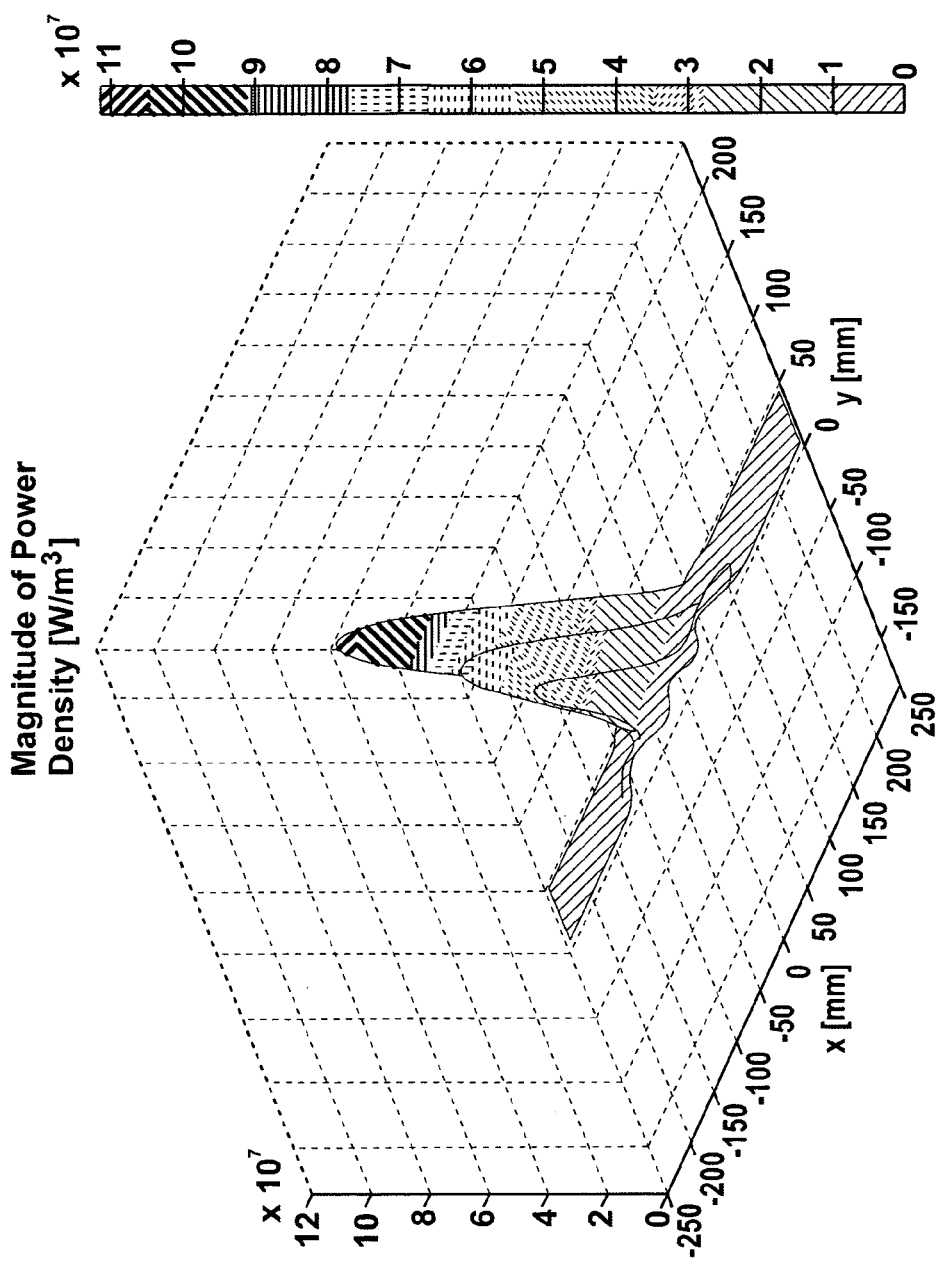

FIGS. 20A and 20B show a comparison of the applicator of FIG. 14 versus the new applicator of FIG. 15 for the same material operated at a power of 30 kW at 2.45 GHz. FIG. 20A is for the applicator of FIG. 14, and FIG. 20B is for the applicator of FIG. 15.

The better performance of the new applicator compared to the old one can be evaluated in FIGS. 20A and 20B in terms of peak electric field strength. For a microwave power input of 30 kW at 2450 MHz in both applicators, the new applicator has a power density of $11.1 \times 10^7$ W/m$^3$ as opposed to $7.9 \times 10^7$ W/m$^3$ for the old applicator for exactly the same load. This difference can be attributed to the fact that the new applicator has got a lower quality factor coupled with a more periodic behaviour as opposed to the old applicator which is designed to support a standing wave which makes the tuning more difficult.

By having the microwave applicator below the material to be microwaved we de-sensitise the system to the exact dielectric properties, and exact volume, and exact position, of the feedstock being microwaved.

Dust extraction is achieved by the extractor 230. This has a pump or fan to extract gases, and dust entrained in a gas, from the microwave tunnel in which the feedstock material belt extends.

The microwave treatment process (for many different sorts of microwave treatment) can create hot gases, or vapours, or dust (for example steam, or gaseous hydrocarbons, or mineral dust). An extractor can remove such unwanted (and possibly dangerous) substances. An inert gas (e.g. $N_2$) may be used in the microwave tunnel to suppress the risk of fine dust or oxidation of substances. Hot gases ten to rise, and so having the microwave applicator below the feedstock (or at least the side of it) means that the evolved substances do not tend to rise into the applicator, possibly corroding it.

A dust screen or trap may be provided between the microwave generator itself and the microwave chamber. This may alleviate concerns about things falling into the microwave generator. A screen or filter is shown as reference 320 in FIG. 16.

Removing the microwave applicator from above the microwave chamber frees up space there for vapour removal and/or vapour recovery) machinery.

By having the microwave applicator below the belt with feedstock on it, the position and distance of the base level of the feedstock from the microwave generator input port is constant, invariant with the height of feedstock on the belt. It appears, surprisingly, that this arrangement has a higher power density than was expected for a given load.

Hence, from the above it can be readily appreciated that by applying microwave energy from beneath the material to be processed/treated there are many beneficial advantages. A main advantage surrounds the sensitivity of the system to changing material properties and the ability to match the system to optimise efficiency. By passing the microwave energy through the bed, it is found to be easier to match the system, which in turn, and in addition, makes the system less sensitive to changing material properties. An advantage of feeding microwave energy from below is that the system is less sensitive to changes in belt height and bed depth. However, the bed depth can be used to control the electric field pattern and produce the desired heating regime.

As an additional advantage, any hot gases and vapours created can be removed directly from above the heated zone, without interfering with the microwave feed point. As the waveguide feed is below the conveyor belt, the belt also serves as a "barrier" or guard to prevent dust and debris from falling into the waveguide. This prevents, or at least minimises, the risk that contaminants (such as dust and gases etc.) can pass into the waveguide and hence significantly improves the reliability and/or longevity of the system.

The invention claimed is:

1. A method of expanding a mineral material having a water interlayer between mineral layers from a hydrated, unexpanded state to a less hydrated, expanded state comprising:

heating interlayer water in the mineral to a temperature such as to cause the water to cause the mineral to expand by applying microwaves to the mineral, the microwaves having;
(i) a frequency of between 1 MHz and 3 GHz; and
(ii) a power density of at least $1\times10^6$ W/m$^3$ in the water phase;
wherein the mineral is an exfoliating vermiculite.

2. The method of claim 1 further comprising:
moving the mineral past or through a microwave heating/material expanding zone.

3. The method of claim 2 further comprising:
moving the mineral past or through the zone generally horizontally and/or on a conveyor belt.

4. The method of claim 1 in which the microwaves are constrained to stay within a microwave waveguide, and in which the mineral is moved through a microwave applicator attached to the waveguide.

5. The method of claim 4 further comprising:
having more than one microwave heating zone and preventing power transfer from one zone to another by using a filter or choke disposed between the microwave heating zones.

6. The method of claim 1 further comprising:
creating a bed of particles of the mineral and applying the microwaves from beneath the bed.

7. The method of claim 6 wherein expanded particles of mineral rise up the bed of particles away from the point of application of microwaves, and wherein unexpanded, or less expanded more dense particles, fall downwards in the bed to move closer to the point of application of the microwaves.

8. The method of claim 1 further comprising:
applying at least 1 kW of power to the mineral.

9. The method of claim 1 further comprising:
producing at least 50 kg/hour of expanded vermiculite.

10. The method of claim 1 wherein the bulk mineral is transparent to the microwave frequency used.

11. The method of claim 1 wherein microwaves are applied at a heating zone and in which dust is extracted at the heating zone by a dust extractor.

12. The method of claim 1 wherein expanded mineral is produced having a bulk temperature of, or less than, 150° C. when expanded.

13. The method of claim 1 wherein expanded mineral is passed directly from an expanding process to a packaging process, without a stationary cooling process in between.

14. The method of claim 1 further claim comprising:
having a bed of mineral particles with a uniform depth of at least 5 mm at the time that microwaves are applied to the particles.

15. The method of claim 1 wherein a microwave heating zone extends across a full width of a conveyor belt and the peak microwave energy density and/or cumulative microwave energy experienced by mineral particles as they pass through the heating zone is uniform to within 20%, across the width of the belt.

16. The method of claim 1 wherein the heating is performed by a mobile mineral expander that is portable or provided in or on a wheeled or tracked vehicle.

17. The method of claim 1 wherein the microwaves have a frequency of about 2.45 GHz and a power of about 15 kW.

18. The method of claim 1 wherein the microwaves have a frequency of about 2.45 GHz and a power of about 30 kW.

19. The method of claim 1 wherein the microwaves have a frequency of about 900 MHz and a power of about 75-100 kW.

20. The method of claim 1 wherein the microwaves have a frequency of about 900 MHz and a power of about 150 kW.

* * * * *